US010548057B2

United States Patent
Rune et al.

(10) Patent No.: US 10,548,057 B2
(45) Date of Patent: Jan. 28, 2020

(54) MULTI-CELL REGISTERED RADIO CONNECTION IN CELLULAR NETWORK

(71) Applicant: Telefonaktiebolaget LM Ericsson (publ), Stockholm (SE)

(72) Inventors: Johan Rune, Lidingö (SE); Gunnar Mildh, Sollentuna (SE)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 15/753,110

(22) PCT Filed: Aug. 17, 2015

(86) PCT No.: PCT/EP2015/068847
§ 371 (c)(1),
(2) Date: Feb. 15, 2018

(87) PCT Pub. No.: WO2017/028897
PCT Pub. Date: Feb. 23, 2017

(65) Prior Publication Data
US 2019/0014512 A1  Jan. 10, 2019

(51) Int. Cl.
*H04W 36/00* (2009.01)
*H04W 24/10* (2009.01)
(Continued)

(52) U.S. Cl.
CPC ....... *H04W 36/0072* (2013.01); *H04W 24/10* (2013.01); *H04W 36/0016* (2013.01); *H04W 36/08* (2013.01); *H04W 28/26* (2013.01)

(58) Field of Classification Search
CPC ......... H04W 36/0072; H04W 36/0016; H04W 24/10; H04W 36/08; H04W 28/26
See application file for complete search history.

(56) References Cited

U.S. PATENT DOCUMENTS 9,008,040 B2    4/2015  Song et al.
2010/0279695 A1  11/2010  Amirijoo et al.
(Continued)

FOREIGN PATENT DOCUMENTS

WO    2013074457 A1    5/2013
WO    2015113305 A1    8/2015

OTHER PUBLICATIONS

International Search Report and Written Opinion dated Jun. 14, 2016 for International Application No. PCT/EP2015/068847 filed on Aug. 17, 2015, consisting of 11-pages.
(Continued)

*Primary Examiner* — Ajay Cattungal
(74) *Attorney, Agent, or Firm* — Christopher & Weisberg, P.A.

(57) ABSTRACT

A radio device configures a radio connection between the radio device and a cellular network. The radio connection is registered for a cell area comprising at least a first cell and a second cell of the cellular network. Before a decision of the radio device to perform a change from the first cell to the second cell, the radio device determines a configuration which enables performing allocation of radio resources to the radio device via a control channel of the second cell. After the change of the radio device from the first cell to the second cell, the radio device resumes transmission on the radio connection by requesting allocation of radio resources of second cell based on the determined configuration.

17 Claims, 11 Drawing Sheets

(51) Int. Cl.
    *H04W 36/08*     (2009.01)
    *H04W 28/26*     (2009.01)

(56) References Cited

U.S. PATENT DOCUMENTS

| | | | | |
|---|---|---|---|---|
| 2011/0170422 | A1* | 7/2011 | Hu | H04W 36/0055 |
| | | | | 370/242 |
| 2013/0016841 | A1* | 1/2013 | Fong | H04L 5/001 |
| | | | | 380/287 |
| 2013/0017823 | A1* | 1/2013 | Mao | H04W 36/04 |
| | | | | 455/424 |
| 2013/0215848 | A1* | 8/2013 | Kato | H04W 74/002 |
| | | | | 370/329 |
| 2014/0044097 | A1* | 2/2014 | Chen | H04W 36/24 |
| | | | | 370/331 |
| 2014/0050130 | A1* | 2/2014 | Kim | H04L 5/001 |
| | | | | 370/280 |
| 2014/0092865 | A1* | 4/2014 | Heo | H04L 1/1812 |
| | | | | 370/331 |
| 2014/0334440 | A1* | 11/2014 | Wong | H04W 36/0011 |
| | | | | 370/331 |
| 2017/0099621 | A1* | 4/2017 | Michaelsen | H04W 36/0033 |
| 2018/0199319 | A1* | 7/2018 | Eriksson | H04L 5/0048 |

OTHER PUBLICATIONS

International Preliminary Report on Patentability dated Nov. 28, 2017 for International Application No. PCT/EP2015/068847 filed on Aug. 17, 2015, consisting of 26-pages.

\* cited by examiner

MULTI-CELL REGISTERED RADIO CONNECTION IN CELLULAR NETWORK

CROSS-REFERENCE TO RELATED APPLICATIONS

This application is a Submission Under 35 U.S.C. § 371 for U.S. National Stage Patent Application of International Application No. PCT/EP2015/068847 ,filed Aug. 17, 2015 entitled "MULTI-CELL REGISTERED RADIO CONNECTION IN CELLULAR NETWORK"the entirety of which is incorporated herein by reference.

TECHNICAL FIELD

The present invention relates to methods for controlling radio transmission in a cellular network and to corresponding devices.

BACKGROUND

In current cellular radio technologies, such as the LTE (Long Term Evolution) technology specified by 3GPP ($3^{rd}$ Generation Partnership Project), it is known to provide different mobility states a user equipment (UE) can be in. In the LTE technology, such mobility states are the idle state and the connected state, also referred to as RRC_IDLE state and RRC_CONNECTED states, respectively.

In the idle state, the UE keeps track of which cell it is located in and monitors a PDCCH (Physical Downlink Control Channel) in that cell for paging messages on specific paging occasions. This is also referred to as "camping" on the cell. The cellular network can contact the UE only on these specific paging occasions. On the other hand, the UE can access the cellular network using a random access procedure. This can be done each time when resources on a contention based physical random access channel (PRACH) are available, which typically occurs more frequently than the paging occasions. The UE performs measurements on surrounding cells and performs cell re-selection when needed in order to camp on a new cell. In the idle state the UE can move around within a certain area, consisting of the cells belonging to a Tracking Area (TA) in a TA list currently configured for the UE, without informing the cellular network. If the UE leaves the area corresponding to the configured TA list, it informs the cellular network through a Tracking Area Update (TAU). Further, the UE may also perform periodic TAUs to inform the cellular network that it is still reachable.

In the connected state the UE is connected to a certain cell, also referred to as serving cell, and monitors the PDCCH of this cell for downlink assignments addressed to the UE. The UE performs measurements on neighbor cells and when certain conditions are fulfilled the UE generate measurement reports which are sent to a base station of the cell, in the LTE technology referred to as eNB. Based on these measurements, the eNB may then decide to initiate a handover of the UE to a neighbor cell. In the connected state, the UE can access the network by sending a scheduling request (SR) on a PUCCH (Physical Uplink Control Channel) of the serving cell. If the UE has lost uplink synchronization, the UE may also access the cellular network through a random access procedure. In connected state the UE monitors the downlink control channel in every sub-frame, unless it has been configured with Discontinuous Reception (DRX). In connected state DRX, the UE monitors the downlink control channel only during regularly occurring active periods (which may be prolonged if data transmission/reception is ongoing), which are separated by usually longer inactive periods. Thus, during connected state DRX the network can reach the UE only during the active DRX periods. The UE, on the other hand, may access the network at any time using the methods described above. If no DRX is configured, the cellular network can contact the UE practically at any time via the PDCCH, and the UE can access the cellular network practically at any time via the PUCCH.

However, in certain scenarios the above-mentioned idle state and connected state may provide unsatisfactory results. Examples of such scenarios are semi-stationary UEs, e.g., UEs which are stationary but sometimes need to change cell due to shadowing or reflection of radio signals by close by objects, or UEs which are only moving in a limited area. While the idle state may be adequate as long as there is no transmission of data, it may cause excessive signaling overhead if transitions to the connected state are needed for transmission of data. This may for example happen in the case of MTC (Machine Type Communication) UEs, where typically only a small amount of data is transmitted on sparse occasions, or in the case of smartphone type UEs, which may generate burst-like traffic resulting in frequent changes between the idle state and the connected state.

In the case of completely stationary devices, the connected state in connection with DRX may allow for keeping the signaling overhead for sparse transmissions low. However, in the case of mobile UEs, the connected state may cause significant signaling overhead associated with the handovers between different cells. Further, such handovers may be problematic in the case of extended DRX sleep times, which may conflict with the frequent measurements and potential measurement reporting needed to support handovers.

Accordingly, there is a need for techniques which allow for efficiently controlling radio transmission in a cellular network with respect to efficient change of a UE between cells.

SUMMARY

According to an embodiment of the invention, a method of controlling radio transmission in a cellular network is provided. According to the method, a radio device configures a radio connection between the radio device and the cellular network. The radio connection is registered for a cell area comprising at least a first cell and a second cell of the cellular network. Before a decision of the radio device to perform a change from the first cell to the second cell the radio device determines a configuration which enables performing allocation of radio resources to the radio device via a control channel of the second cell. After the change of the radio device from the first cell to the second cell, the radio device resumes transmission on the radio connection by requesting allocation of radio resources of second cell based on the determined configuration.

According to a further embodiment of the invention, a method of controlling radio transmission in a cellular network is provided. According to the method, a RAN node configures a radio connection between a radio device and the cellular network. The radio connection is registered for a cell area comprising at least a first cell and a second cell of the cellular network. The second cell is served by the RAN node. Before a decision of the radio device to perform a change from the first cell to the second cell, the RAN node determines a configuration which enables performing allocation of radio resources to the radio device via a control channel of the second cell. After the change of the radio device from the first cell to the second cell, the RAN node resumes transmission on the radio connection by performing allocation of radio resources of second cell to the radio device based on the determined configuration.

According to a further embodiment of the invention, a method of controlling radio transmission in a cellular network is provided. According to the method, a RAN node configures a radio connection between a radio device and the cellular network. The radio connection being registered for a cell area comprising at least a first cell and a second cell of the cellular network. The first cell is served by the RAN node. Before a decision of the radio device to perform a change from the first cell to the second cell, the RAN node determines a configuration which enables performing allocation of radio resources to the radio device via a control channel of the first cell. After the change of the radio device from the first cell to the second cell, the RAN node maintains the determined configuration.

According to a further embodiment of the invention, a radio device is provided. The radio device is configured to configure a radio connection between the radio device and a cellular network. The radio connection is registered for a cell area comprising at least a first cell and a second cell of the cellular network. Further, the radio device is configured to, before a decision of the radio device to perform a change from the first cell to the second cell, determine a configuration which enables performing allocation of radio resources to the radio device via a control channel of the second cell. Further, the radio device is configured to, after the change from the first cell to the second cell, resume transmission on the radio connection by requesting allocation of radio resources of second cell based on the determined configuration. The radio device may for example comprise a radio interface to the cellular network. Via this radio interface the radio connection to the cellular network may be established and radio transmissions on the radio connection be performed. Further, the radio device may comprise at least one processor which is configured to execute or control the above-mentioned configuring of the radio connection, determining the configuration of the control channel, and resuming of transmission.

According to a further embodiment of the invention, a RAN node is provided. The RAN node is configured to configure a radio connection between a radio device and a cellular network. The radio connection is registered for a cell area comprising at least a first cell and a second cell of the cellular network. The second cell is served by the RAN node. Further, the RAN node is configured to, before a decision of the radio device to perform a change from the first cell to the second cell, determine a configuration which enables performing allocation of radio resources to the radio device via a control channel of the second cell. Further, the RAN node is configured to, after the change of the radio device from the first cell to the second cell, resume transmission on the radio connection by performing allocation of radio resources of second cell to the radio device based on the determined configuration. The RAN node may for example comprise a radio interface to the radio device. Via this radio interface the radio connection to the radio device may be established and radio transmissions on the radio connection be performed. Further, the RAN node may comprise at least one processor which is configured to execute or control the above-mentioned configuring of the radio connection, determining of the configuration, and resuming of transmission.

According to a further embodiment of the invention, a RAN node is provided. The RAN node is configured to configure a radio connection between a radio device and a cellular network. The radio connection is registered for a cell area comprising at least a first cell and a second cell of the cellular network. The first cell is served by the RAN node. Further, the RAN node is configured to, before a decision of the radio device to perform a change from the first cell to the second cell, determine a configuration which enables performing allocation of radio resources to the radio device via a control channel of the first cell. Further, the RAN node is configured to maintain the determined configuration after the change of the radio device from the first cell to the second cell. The RAN node may for example comprise a radio interface to the radio device. Via this radio interface the radio connection to the radio device may be established and radio transmissions on the radio connection be performed. Further, the RAN node may comprise at least one processor which is configured to execute or control the above-mentioned configuring of the radio connection, determining of the configuration, and maintaining of the determined configuration after the change to the second cell.

According to a further embodiment of the invention, a computer program or computer program product is provided, e.g., in the form of a non-transitory storage medium, which comprises program code to be executed by at least one processor of a radio device. Execution of the program code by the at least one processor causes the radio device to configure a radio connection between the radio device and a cellular network. The radio connection is registered for a cell area comprising at least a first cell and a second cell of the cellular network. Further, execution of the program code by the at least one processor causes the radio device to, before a decision of the radio device to perform a change from the first cell to the second cell, determine a configuration which enables performing allocation of radio resources to the radio device via a control channel of the second cell. Further, execution of the program code by the at least one processor causes the radio device to, after the change from the first cell to the second cell, resume transmission on the radio connection by requesting allocation of radio resources of second cell based on the determined configuration.

According to a further embodiment of the invention, a computer program or computer program product is provided, e.g., in the form of a non-transitory storage medium, which comprises program code to be executed by at least one processor of a RAN node. Execution of the program code by the at least one processor causes the RAN node to configure a radio connection between a radio device and a cellular network. The radio connection is registered for a cell area comprising at least a first cell and a second cell of the cellular network. The second cell is served by the RAN node. Further, execution of the program code by the at least one processor causes the RAN node to, before a decision of the radio device to perform a change from the first cell to the second cell, determine a configuration which enables performing allocation of radio resources to the radio device via a control channel of the second cell. Further, execution of the program code by the at least one processor causes the RAN node to, after the change of the radio device from the first cell to the second cell, resume transmission on the radio connection by performing allocation of radio resources of second cell to the radio device based on the determined configuration. Details of such embodiments and further embodiments will be apparent from the following detailed description of embodiments.

DETAILED DESCRIPTION OF EMBODIMENTS

Figure 1:
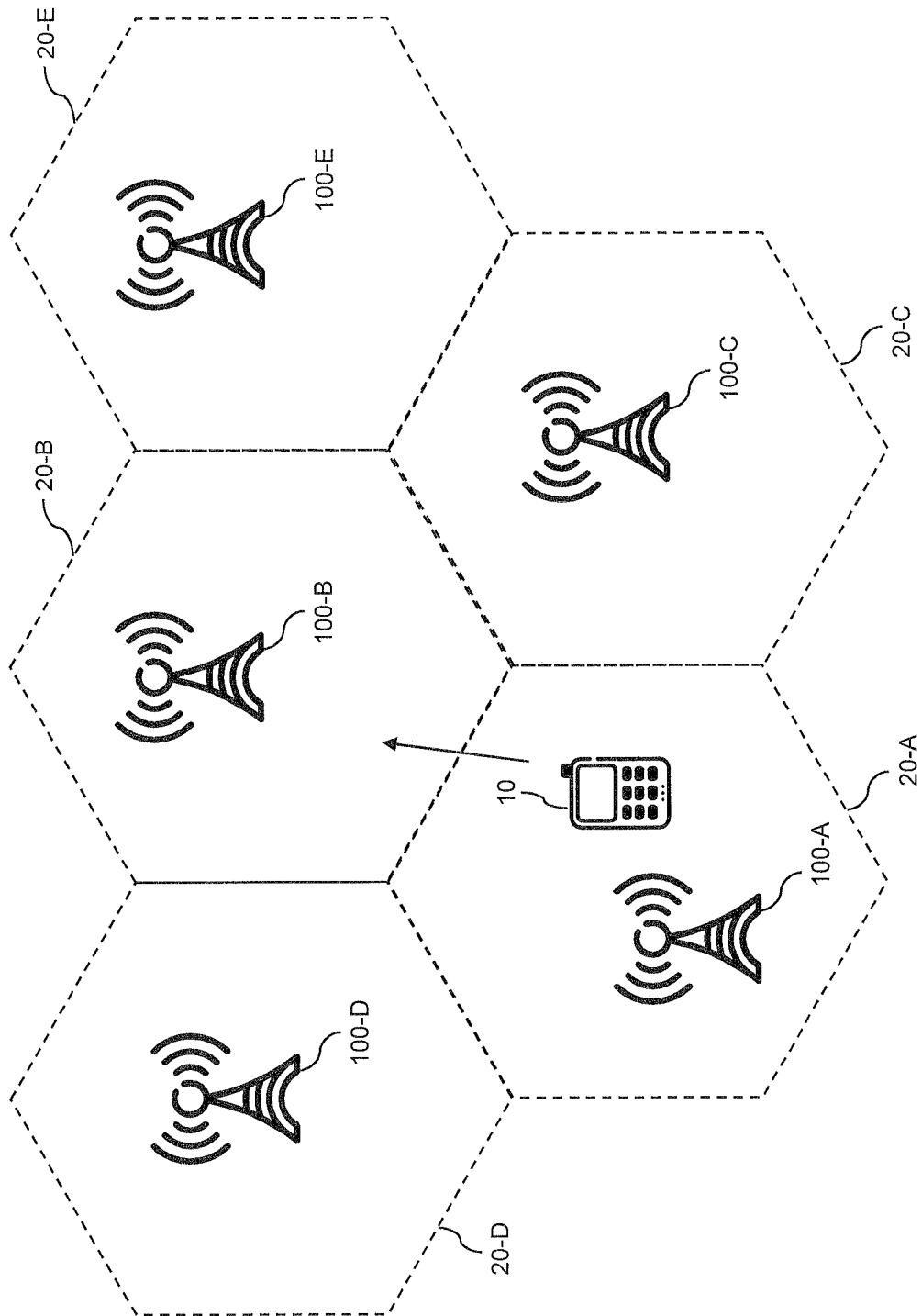
FIG. 1 schematically illustrates an example of a scenario in which a UE performs a cell change according to an embodiment of the invention.

In the following, concepts in accordance with exemplary embodiments of the invention will be explained in more detail and with reference to the accompanying drawings. The illustrated embodiments relate to concepts for controlling radio communication in a cellular network. The embodiments specifically refer to a scenario based on utilizing the LTE radio technology. However, it should be understood that the concepts could also be applied in connection with other radio access technologies, e.g., future evolutions of the LTE radio technology, e.g., a 5G ($5^{th}$ Generation) cellular radio technology.

In the illustrated concepts, a cell change of a UE may be handled in an optimized manner. For this purpose, a radio connection of between UE and the cellular network is registered for a cell area which includes a plurality of cells. A decision whether to change from a first cell (in the following also referred to as source cell) to a second cell (in the following also referred to as target cell) of the cell area is performed by the UE. Accordingly, as compared to the connected state of the LTE radio technology, the cell change may be performed without notifying the network, such as by sending measurement reports, and without control of the individual cell change process from the cellular network. In particular, network controlled handover processes are not needed and thus no measurement reporting from the UE to the cellular network is needed.

In the illustrated concepts, a certain configuration is prepared in the UE and a RAN node serving the target cell already before the UE decides to perform the cell change. This may for example be accomplished during a previous visit of the UE in the target cell or at establishment of the radio connection. The configuration enables performing allocation of radio resources of the target cell via a control channel of the target cell. This control channel can for example include a PUCCH and/or a PDCCH as specified for the LTE radio technology, and the configuration may include a cell-level identity of the UE for the target cell, e.g., a C-RNTI (Cell Radio Network Temporary Identity), a Timing Advance for the target cell, and/or a configuration of SR opportunities on the PUCCH of the target cell. Based on the prepared configuration, the UE can directly access the target cell after the cell change to the target cell and resume transmission by requesting allocation of radio resources. Similarly, the cellular network may directly address the UE after the cell change based on this configuration by performing allocation of radio resources to the UE based on the prepared configuration. Accordingly, radio transmissions on the radio connection can be performed while the UE moves within the cell area, without causing an excessive signaling overhead associated with cell changes. The utilization of such radio connection which is registered in a cell area may be associated with a corresponding mobility state of the UE. In the following, this state will also be referred to as "multi-cell connected state".

The cell area may be communicated to the UE using RRC (Radio Resource Control) signaling from the eNB or NAS (Nob Access Stratum) signaling from the MME (Mobility Management Entity). This may be accomplished when the radio connection is established or when the radio connection is registered for the cell area. In some scenarios, the registration may be accomplished when establishing the radio connection. In other cases, the radio connection may first be established and then later registered for the cell area, e.g., in response to the UE switching to a the multi-cell connected state. Such switching may for example be controlled on the basis of activity of the UE, using an inactivity timer. Further, such switching may be event triggered.

In typical scenarios, the cell area for which the radio connection is registered may be smaller than an area defined by a TA list as for example used in the idle state of the LTE radio technology. For example, the cell area may consist of the cells served by the RAN node of the connected cell and of the cells served by neighboring RAN nodes, which have a direct interface to the RAN node serving the connected cell. For example, these RAN nodes may correspond to eNBs of the LTE radio technology, and the interface between these RAN nodes may correspond to the X2 interface of the LTE radio technology. In some scenarios, this can also mean that the cell area can be updated when after a cell change the new cell is served by another RAN node. In other scenarios, the cell area may be statically determined when the radio connection is established, e.g., include the cell in which the radio connection is established, cells served by the same RAN node as this cell, and cells served by neighboring RAN nodes of this RAN node. By limiting the cell area to cells served by neighboring RAN nodes, excessive signaling load associated with the preparation of the cells for the cell changes may be avoided. However, it is to be understood that a larger or smaller cell area could be utilized as well.

Accordingly, the cell area may be defined in various ways: In some scenarios, the cell area consists of the cells served by the same RAN node as the cell in which the UE 10 is currently connected, i.e., the connected cell. In some scenarios, the cell area consists of the cell in which the UE is currently connected, i.e., the connected cell, and its neighbor cells (not necessarily served by the same RAN node). In some scenarios, the cell area consists of the cells controlled by the same RAN node as the cell in which the UE 10 is currently connected, i.e., the connected cell, and the cells served by neighboring RAN nodes of the RAN node serving the connected cell. For example, if the RAN nodes correspond to eNBs, the neighboring RAN nodes may correspond to X2 neighbors of the eNB serving the connected cell. In some scenarios, the cell area may be extended even beyond cells served by neighboring RAN nodes.

FIG. 1 schematically illustrates a scenario in which the above concepts may be applied. Specifically, FIG. 1 shows a UE 10 which is located in a cell area including cells 20-A, 20-B, 20-C, 20-D, 20-E, served by RAN nodes 100-A, 100-B, 100-C, 100-D, 100-E, respectively. In the scenario of FIG. 1, it is assumed that these RAN nodes 100-A, 100-B, 100-C, 100-D, 100-E correspond to eNBs of the LTE radio technology. A radio connection of the UE 10 to the cellular network is registered for all cells of the cell area, which means that the UE 10 and eNBs 100-A, 100-B, 100-C, 100-D, 100-E serving these cells, are configured in such a way that the UE 10 can move between these cells without notifying the cellular network, while maintaining the radio connection. At a given point of time, the UE 10 typically connected to one of the cells, in the following referred to as connected cell. In FIG. 1, the cell 20-A is assumed to be the connected cell. If the UE 10 determines that a certain cell re-selection criterion is met, the UE 10 can change to one of the other cells 20-B, 20-C, 20-D, 20-E of the cell area without notifying the network or receiving a command from the cellular network. Such cell selection criterion may for example involve a comparison of a channel quality estimated by the UE 10 for the connected cell 20-A to a channel quality estimated by the UE 10 for the other cell 20-B, 20-C, 20-D, 20-E. In the scenario of FIG. 1, it is assumed that the UE 10 decides to change to the cell 20-B, which then becomes the new connected cell.

The registration of the radio connection for the plurality of cells 20-A, 20-B, 20-C, 20-D, 20-E of the cell area may for example be accomplished by indicating these cells to the UE 10. This may be accomplished explicitly, e.g., by sending a list of individual cell identifiers such as Global Cell Identity (GCI), Evolved Global Cell Identity (ECGI) or Physical Cell Identity (PCI) Ds, PCIs). Alternatively or in addition, the cells 20-A, 20-B, 20-C, 20-D, 20-E of the cell area could also be indicated by one or more identifiers assigned to a set of cells such as Tracking Area Identity (TAI), Service Area Identity (SAI) or Location Area Identity (LAI). Further, the cells 20-A, 20-B, 20-C, 20-D, 20-E of the cell area may also be indicated by identifiers of eNBs serving the cells, e.g., eNB identities. In some scenarios, the cell area can also be indicated implicitly. For example, the UE 10 could derive the cell area from the identity of the connected cell 20-A and/or the identity of the eNB 100-A serving the connected cell 20-A, e.g., assuming that the cell area is defined by cells served by the same eNB. Similarly, the radio connection may be configured in the eNBs 100-A, 100-B, 100-C, 100-D, 100-E serving the cells 20-A, 20-B, 20-C, 20-D, 20-E of the cell area, e.g., by providing an identifier of the radio connection and/or of the UE 10 to these eNBs 100-A, 100-B, 100-C, 100-D, 100-E. Further, also information on the cell area may be provided at each of these eNBs 100-A, 100-B, 100-C, 100-D, 100-E, e.g., in a similar way as on the UE side. In typical scenarios, each of the eNBs at least temporarily maintains a context of the radio connection. Certain parts of this context, which are subject to dynamic changes during the ongoing radio connection, may be regularly updated, e.g., according to a certain periodicity or when the UE 10 changes between cells. The context may for example a PDCP (Packet Data Convergence Protocol) status of the radio connection, downlink data to be transmitted to the UE 10, and/or uplink data received from the UE 10.

When the UE 10 leaves the cell area, i.e., changes to a cell outside the cell area, a handover to this cell may be initiated, e.g., similar to the handover as used in the connected state of the LTE radio technology. After such handover, the radio connection may be registered in a new cell area including the cell to which the handover was performed. Accordingly, if the UE 10 is located at a border of the cell area, measurement reporting may be performed in a conventional manner. On the UE side, such measurement reporting may for example be initiated depending on whether signals from cells outside the cell area are received or depending on the strength of such received signals from cells outside the cell area.

The context of the radio connection between the UE 10 and the cellular network is maintained at least in the eNB 100-A serving the connected cell 20-A, which typically is the cell where the UE 10 most recently was in contact with the network. If the UE 10 changes to another cell of the cell area, such as in the scenario of FIG. 1 from the cell 20-A to the cell 20-B, the context is transferred to the new cell, i.e., to the eNB 20-B which serves the new cell 20-B. If the connected cell 20-A and the new cell are served by the same eNB, the context may be transferred to another cell level subsystem within this eNB. The cell change may be handled as an implicit handover, which is performed without measurement reporting by the UE 10 and without a handover command from the cellular network to the UE 10.

For uplink transmissions, the change to the new cell may be detected by the UE 10 performing a random access procedure in the new cell or, if the UE 10 is already provided with a corresponding configuration, by the UE 10 requesting allocation of resources of an uplink transmission by sending a SR on the PUCCH of the new cell.

For downlink transmissions, the eNB 100-A serving the connected cell 20-A may first attempt to reach the UE 10 in the connected cell 20-A by sending a downlink assignment to the UE 10 on the PDCCH of the connected cell and sending the corresponding downlink data. If the UE 10 cannot be reached, e.g., does not acknowledge receipt of the downlink data, the eNB 100-A serving the connected cell 20-A may initiate paging of the UE 10 in the other cells 20-B, 20-C, 20-D, 20-E of the cell area. When the UE 10 responds to the paging in the new cell, e.g., in the cell 20-B, the cell change can be detected by the cellular network and the context of the radio connection be transferred to the new cell.

The transferring of the context may be managed by the involved eNBs, e.g., using the X2 interface. Further, also the S1 interface as defined between eNB and MME may be used to transfer the context between from one eNB via the MME to another eNB. The transfer of the context may be based on information which enables identification of the of the correct context data. Such information may for example include a cell identity of the old connected cell, e.g., a CGI, ECGI, or PCI, a cell-level identifier, e.g., C-RNTI, of the UE 10 in the old connected cell, an identifier of the eNB serving the old connected cell, e.g., eNB identity, and/or a context identifier. If a context identifier is used, this may be allocated to the UE 10 when the context is established in the cell, e.g., when establishing the radio connection. This may for example be accomplished by a Random Access Response message, a RRCConnectionSetup message, a RRCConnectionReconfiguration message, or a Control Element (CE) of a MAC (Media Access Control) PDU (Packet Data Unit). Such MAC PDU may at the same time also carry higher layer signaling, e.g., an RRC message, such as the above-mentioned RRCConnectionSetup message or RRCConnectionReconfiguration message. In the course of a network controlled handover, the context identifier may be allocated by an IE (Information Element) referred to as the "mobilityControlInfo" in the RRCConnectionReconfiguration message which constitutes the handover command. Further, the context identifier may also be allocated by an IE in any other RRCConnectionReconfiguration message.

The transferring of the context may also be managed the MME. For example, the MME may obtain the context from the eNB 100-A serving the old connected cell 20-A and provide it to the eNB 100-B serving the new cell 20-B. In some scenarios, the MME could also maintain a copy of the context, which may be regularly updated, and deliver this copy to the eNB 100-B of the new cell. The MME may then initiate deletion of the context at the old connected cell.

In the new cell 20-B, a new C-RNTI may be assigned to the UE 10. This may be performed during a random access procedure in the new cell 20-B, by promoting a TC-RNTI (Temporary C-RNTI) to a regular C-RNTI. During this random access procedure, the UE 10 may also be provided with a valid Timing Advance for the new cell and be configured with opportunities for sending a SR on the PUCCH of the new cell.

In some scenarios, network controlled handover procedures may be used in addition to the above-mentioned cell change which is decided by the UE 10. For example, the eNB 100-A serving the connected cell 20-A may decide that another cell (which may be part of the cell area or not) is better suited for the UE 10 and initiate the handover. Apart from considering measurement reports by the UE 10, this could for example also be done with the aim of reducing a load of the connected cell 20-A. Such handovers may be supported by measurement reports from the UE 10. In order to limit the signaling load associated with such measurement reporting, the UE 10 may be configured to perform measurement reporting in a conditional manner, e.g., triggered by transmissions on the radio connection. For example, the UE 10 could be configured to report measurements until expiry of a time limit after sending or receiving data on the radio connection.

After a period of inactivity on the radio connection, the UE 10 may resume transmission in the connected cell 20-A. During this period, the UE 10 may have temporarily changed to other cells 20-B, 20-C, 20-D, 20-E of the cell area, however without notifying the cellular network about these cell changes. Having returned to the connected cell 20-A, the UE 10 may resume transmission on the radio connection by sending a SR on the PUCCH of the connected cell 20-A. However, after having changed to another cell 20-B, 20-C, 20-D, 20-D of the cell area, e.g., to the cell 20-B as illustrated in FIG. 1, directly sending the SR may not be possible if a corresponding configuration was not prepared at the UE 10 and the eNB 100-B serving the cell 20-B. For example, the UE 10 may not be configured with a Timing Advance for the new cell 20-B or with SR opportunities on the PUCCH of the new cell 20-B. In such cases, the UE 10 may initiate a random access procedure in the new cell 20-A. During the random access procedure, the UE 10 may be configured with a Timing Advance, and uplink radio resources of the new cell 20-A may be indicated to the UE 10 by an uplink grant in a Random Access Response message. When performing an uplink transmission on these uplink radio resources, the UE 10 may include in this uplink transmission the information that enables the eNB 100-B serving the new cell to obtain the context of the radio connection from the eNB 100-A serving the old connected cell 20-A. This uplink transmission may also include an indication that the UE 10 is in the multi-cell connected state, e.g., to trigger fetching of the context by the eNB 100-B serving the new cell 20-B. The information and/or indication may be included in one or more MAC CEs of a MAC PDU carrying uplink data transmitted on the radio connection to the new cell 20-B. Further, the information and/or indication may be included in an RRC message, e.g., the first RRC message the UE 10 transmits in the new cell 20-B, such as in an RRCConnectionRequest message or an RRC message specifically defined for this purpose.

There are different options for how to transfer the context and make the new cell 20-B the connected cell. According to one option, the context may be fetched by the eNB 100-B serving the new cell 20-B, and then a user plane data path to a gateway in a core network part of the cellular network, e.g., an SGW (Serving Gateway), may be switched from the eNB 100-A serving the old connected cell 20-A to the eNB 100-B serving the new cell 20-B. The eNB 100-B serving the new cell 20-B can then forward the data received from the UE 10 to the SGW, which means that the new cell 20-B would become the connected cell. The fetching of the context could be accomplished via the X2 interface. If the eNB 100-A and the eNB 100-B are not X2-neighbors, the context could be fetched via the S1-MME interface and the MME, and optionally the S10 interface between different MMEs or through a dynamically established connection through a transport network. If the context is fetched via the MME or multiple MMEs, the MME could forward a transparent container (with context retrieval request in one direction and returned context in the other direction), or the MME could be actively participate in the process of transferring the context, e.g., by issuing or answering a request for the context. For example, in the latter case, the new eNB 100-B could send a request for the context to the MME, and the MME could send a request for the context to the eNB 100-A, which may optionally be done via another MME. The eNB 100-B may then respond to the received request by sending the context to the MME, and the MME may respond to the received request by sending the context to the eNB 100-A.

When using a dynamically established connection through the transport network for transferring the context, the address of the eNB 100-B may be located via DNS (Domain Name System), e.g., using a FQDN (Fully Qualified Domain Name) derived from the above-mentioned information provided by the UE 10, e.g., the cell identity of the cell 20-A or eNB identity of the eNB 20-A.

When the context has been obtained by the eNB 100-B, the user plane data path may be switched in a similar manner as for handovers in the connected state of the LTE radio technology. If the MME is actively participates in the context transfer, a single message exchange could be used between the new eNB 100-B and the MME to initiate both context transfer and path switching.

If there was ongoing activity on the radio link in the old connected cell 20-A and the eNB 100-A still has buffered data received on the radio connection or pending data to be transmitted on the radio connection, such data may also be forwarded from the eNB 100-A to the 100-B and vice versa. This may be performed in a similar way as for an S1 handover procedure, e.g., as defined in 3GPP TS 23.401 V13.3.0, or via a dynamically established connection over a transport network.

If the eNB 100-A and the eNB 100-B are X2 neighbors, the context transfer can be performed via the X2 interface, e.g., using extensions to the X2AP (X2 Application Protocol). The switching of the user plane data path and optional forwarding of data can then be performed in a similar way as for an X2 handover procedure, e.g., as defined in 3GPP TS 23.401 V13.3.0.

If the new cell 20-B and the old connected cell 20-B are both served by the same eNB, the context transfer may be managed internally within the eNB, e.g., by transferring corresponding information between different hardware or software subsystems of this eNB.

According to a further option, the MME of the eNB 100-A maintains a copy of the context, which may be regularly updated, and provides this copy of the context to eNB 100-B when the eNB 100-B requests the context after the cell change. In this case, certain dynamically varying parts of the context, e.g., PDCP sequence numbers, may not be up to date in the copy of the context as maintained at the MME. Such parts of the context may then later be updated in the eNB 100-B. After providing the copy of the context to the eNB 100-B and optionally after updating dynamically varying parts of the context, the eNB 100-B may request the eNB 100-A to delete the context.

According to a further option, data to be transmitted to the UE 10 are forwarded by the old eNB 100-A to the eNB 100-B, and data transmitted from the UE 10 are forwarded by the eNB 100-B to the eNB 100-A while the context is maintained at the eNB 100-A. A user plane data path to the core network part of the cellular network, e.g., to the SGW, may thus be maintained at the eNB 100-A. This situation may for example be maintained until a period of inactivity on the radio connection begins, at which point the context may be transferred and the user plane data path switched to the eNB 100-B. The old eNB 100-A may this continue to perform tasks, such as ciphering/deciphering and integrity protection, for the radio connection, until the until the user plane data path is switched. In this option, communication between the eNB 100-A the eNB 100-B may be organized in a similar way as in the first mentioned option, e.g., either mediated by the MME(s) or performed directly between the eNBs using the X2 interface or a dynamically established connection through the transport network. In this option, a data forwarding path and data forwarding between the eNBs 100-A, 100-B is established first, and then the context transfer may be initiated in a similar way as in the first mentioned option, followed by switching of the user plane data path to the eNB 100-B.

According to a further option, the UE 10 could send a specifically adapted RRC message as third message of a random access procedure in the new cell 20-B, using the uplink radio resources allocated by the uplink grant in the Random Access Response, to indicate that it wants to initiate an uplink transmission in the current cell. This may in turn could trigger fetching of the context by the eNB 100-B and switching of the user plane data path. The eNB 100-B may then confirm to the UE 10 that the status of the connected cell was successfully transferred to the eNB 100-B.

When downlink data destined for the UE 10 arrives, e.g., in the SGW, the cellular network may first attempts to deliver the downlink data by scheduling a downlink transmission in the connected cell 20-A. This typically involves sending a downlink assignment on the PDCCH of the connected cell 20-A, thereby indicating downlink radio resources on a PDSCH (Physical Downlink Shared Channel) to the UE 10, and performing a transmission of the downlink data on these downlink radio resource. If in the UE 10 has changed to a new cell, e.g., to the cell 20-B as illustrated in the scenario of FIG. 1, the transmission will fail, which may for example be detected by the eNB 100-A serving the connected cell 20-A on the basis of missing HARQ (Hybrid Automatic Repeat Request) feedback for the transmission. The eNB 100-A may conclude from the failure that the UE 10 potentially changed to another one of the cells 20-B, 20-C, 20-D, 20-E without notifying the cellular network. In order to locate the UE 10, the eNB 100-A may react by initiating paging of the UE 10 in the other cells 20-B, 20-C 20-D, 20-E. When the UE 10 responds to the paging in the new cell 20-B, the context of the radio connection may be transferred to the new cell 20-B and the user plane data path may be switched to the new cell 20-B, using similar mechanisms as explained above.

The paging of the UE 10 may be controlled by the MME. In this case, the eNB 100-A may initiate the paging of the UE 10 by notifying the MME of the failed transmission to the UE 10. Alternatively, the paging could also be controlled by the eNB 100-A, using information on the cell area as maintained by the eNB 100-A, such as provided to the eNB 100-A from the MME when establishing the radio connection or performing the registration. If the paging is controlled by the eNB 100-A, a combination of the cell identity, e.g., the ECGI, and the C-RNTI assigned to the UE 10 in the cell 20-A or a special identifier assigned to the UE 10 for this purpose could be used as a paging identity of the UE 10.

In some scenarios, not only the connected cell 20-A but also at least some of the other cells 20-B, 20-C, 20-D, 20-E of the cell area may maintain the configuration which allows immediate allocation of radio resources of the cell 20-A, 20-B, 20-C, 20-E after a cell change. Accordingly, for example each of the cells 20-B, 20-C, 20-D may maintain such configuration, while in the cell 20-E a random access procedure or paging may be needed before allocation of radio resources via the PDCCH and/or PUCCH if the cell 20-E is possible. In such scenarios, an assignment of the C-RNTI to the UE 10 may be kept for each of the cells 20-A, 20-B, 20-D. Further, these cells 20-A, 20-B, 20-C, 20-D may also keep the context of the radio connection, irrespective of the UE 10 being currently located in the respective cell. The assigned C-RNTI may differ between the cells 20-A, 20-B, 20-C, 20-D. Alternatively, also the same C-RNTI could be used in at least some of the cells 20-A, 20-B, 20-C, 20D. In the later case, coordination the eNBs 100-A, 100-B, 100-C, 100-D may coordinate the assignment of the C-RNTI in such a way that assignment of the same C-RNTI to the UE 10 and to another UE is avoided.

In the cells 20-A, 20-B, 20-C, 20-D which maintain the assignment of the C-RNTI to the UE 10, the above-described paging of the UE 10 in the case of a failed transmission of downlink data may be avoided. Rather, in such cases the cellular network may attempt to reach the UE 10 by addressing a downlink assignment to the UE 10 on the PDCCH of each cell 20-A, 20-B, 20-C, 20-D for which the assignment of the C-RNTI is maintained. In some scenarios, this can be done in a multi-stage process, by first addressing the UE 10 only in the connected cell 20-A, and if the transmission on the assigned radio resources in the connected cell 20-A fails, then proceeding to send downlink assignments addressed to the UE 10 on the PDCCHs of the other cells 20-B, 20-C, 20-D for which the assignment of the C-RNTI is maintained. In some scenarios, if the UE 10 does not have a valid Timing Advance in the other cell 20-B, 20-C, 20-D, the eNB 100-B, 100-C, 100-D of this cell may request that the UE 10 first performs a random access procedure to acquire a valid Timing Advance, before the downlink data is transmitted on the PDSCH of this cell 20-B, 20-C, 20-D. For this purpose, the UE 10 may monitor the PDCCH of the cell 20-B it has changed to for DCI which is addressed by the maintained C-RNTI to the UE 10. If the UE 10 detects such DCI, it may indicates its presence in the cell 20-B by acknowledging receipt or indicating a transmission failure, e.g., through a HARQ and/or RLC (Radio Link Control) feedback mechanism. When presence of the UE 10 in the new cell 20-B was detected in this way, the context of the radio connection may be transferred to the new cell 20-B and the user plane data path may be switched to the new cell 20-B, using similar mechanisms as explained above.

When maintaining the C-RNTI in multiple cells 20-A, 20-B, 20-C, 20-D of the cell area, the UE 10 may resume transmission on the radio link in the new cell 20-B in a similar way as mentioned above, by first performing a random access procedure. However, in this case the UE 10 may also include the C-RNTI assigned to the UE 10 in the new cell 20-B in a message of the random access procedure, e.g., in a MAC CE in the third message of the Random Access procedure, i.e., when transmitting on the radio resources allocated to the UE 10 by the uplink grant in the Random Access Response message. When presence of the UE 10 in the new cell 20-B was detected in this way, the context of the radio connection may be transferred to the new cell 20-B and the user plane data path may be switched to the new cell 20-B, using similar mechanisms as explained above.

Also when maintaining the C-RNTI in multiple cells 20-A, 20-B, 20-C, 20-D of the cell area, it is possible to use a special RRC message from the UE 10 before sending uplink data prior to trigger transfer of the context and switching of the user plane data path.

In scenarios where different C-RNTIs are used in different cells 20-A, 20-B, 20-C, 20-D, the UE 10 may maintain information concerning these C-RNTIs and their association to the cells 20-A, 20-B, 20-C, 20-D. Such information may be provided to the UE 10 when establishing the radio connection or when performing registration of the radio connection for the cell area. For example, if the cell area is communicated to the UE 10 in terms of cell identities, such as ECGIs, a mapping of each C-RNTI may be stored by the UE 10. In a similar manner, the UE 10 may determine and store such mapping when using some other process for determining the cell area, e.g., implicit derivation of the cell area from the cell identity of the connected cell 20-A and its neighbor relations.

In some scenarios, the MME may request the eNBs 100-A, 100-B, 100-C, 100-D, serving the cells 20-A, 20-B, 20-C, 20-D for which the C-RNTI is maintained, to assign a C-RNTI to the UE 10. These eNBs 100-A, 100-B, 100-C, 100-D may then assign the C-RNTIs as requested and indicate the assigned C-RNTIs together with the corresponding cell identities to the MME. The MME may then sends the C-RNTIs and corresponding cell identities to the UE 10, e.g., in a NAS message. Alternatively, the MME may not be involved in the assignment of the C-RNTIs. For example, the eNB 100-A serving the connected cell 20-A may request the other eNBs 100-B, 100-B, 100-C, 100-D, serving the cells 20-B, 20-C, 20-D for which the C-RNTI is maintained, to assign C-RNTIs and indicate the assigned C-RNTIs and the corresponding cell identity to the eNB 100-A, which may then indicate the assigned C-RNTIs and corresponding cell identities to the UE 10.

In some scenarios, the configuration maintained for the cells 20-A, 20-B, 20-C, 20-D may include not only the C-RNTI, but also the Timing Advance and/or opportunities for sending SRs on the PUCCH of the cell 20-A, 20-B, 20-C, 20-D. In such cases, the UE 10 may immediately send a SR on the PUCCH of the new cell 20-B, without requiring a random access procedure.

As mentioned above, the UE 10 may autonomously decide to change between cells of the cell area, without notifying the network with respect to each individual cell change. Rather, a cell change may be detected in response to resuming transmission on the radio connection in a new cell.

Various procedures may be applied in scenarios where the UE 10 leaves the cell area or decides to change to a cell which is not part of the cell area. According to one option, the UE 10 may inform the MME via a NAS message that it left the cell area. The radio connection may then be re-established in another cell area, using similar mechanisms as described above. According to a further option, the UE 10 may send an RRC message to another eNB serving the cell outside the cell area, thereby initiating re-establishment of the radio connection in another cell area. This other eNB may also inform the MME about the cell change to another cell area. According to a further option, the UE 10 may switch to the idle state and perform a TAU in a cell outside the cell area. In response to detecting the TAU, the MME may inform the eNB 100-A serving the previous connected cell 20-A that the UE 10 has left the cell area. Further, the MME may also inform other eNBs 100-B, 100-C, 100-D, 100-E serving cells 20-B, 20-C, 20-D, 20-E of the cell area, e.g., if these other eNBs 100-B, 100-C, 100-D, 100-E have maintained a C-RNTI assigned to the UE 10 or some other configuration related to the radio connection. According to a further option, the UE 10 may switch to the idle state without explicitly notifying the cellular network by a TAU or similar procedure. In such case, expiry of an inactivity timer configured in the cellular network, e.g., in the MME, may trigger that the UE 10 is switched to the idle state also on the network side. If the UE 10 leaves the TAs of its currently configured TA list, the UE 10 may perform a TAU.

While the UE 10 is in the multi-cell connected state, an inactivity timer for the radio connection may be maintained by the eNB 100-A serving the current connected cell, e.g., before the cell change in the scenario of FIG. 1 the cell 20-A. Any activity from the UE 10 in the connected cell 20-A may trigger resetting of the inactivity timer. If the UE 10 initiates activity in another cell of the cell area, the transfer of the context to the new cell, e.g., the cell 20-B in the scenario of FIG. 1, also the responsibility for maintaining the inactivity timer may be transferred to the new cell 20-B, and the inactivity timer be reset.

In the multi-cell connected state, a value of the inactivity timer may be used which is larger than the a value of an inactivity timer for the connected state. In this way, longer inactivity periods may be allowed for the multi-cell connected state. On the other hand, the value of the inactivity timer for the multi-cell connected state may be smaller than a value of a timer for triggering periodic TAUs in the idle state.

To prevent that the UE 10 unintentionally changes to the idle state and that the radio connection is released as a consequence, also a keep-alive signaling mechanism may be provided for the multi-cell connected state. For example, this may be achieved by informing the UE 10 about the value the used for the inactivity timer on the network side. If the UE 10 wants to remain in the multi-cell connected state even if there is no current transmission activity on the radio connection, the UE 10 can generate some transmission activity with the purpose of keeping the radio connection alive, e.g., by performing a transmission before when the inactivity timer is about to expire. Such transmission may include a SR, followed by an uplink transmission including a Buffer Status Report (BSR), but no user plane data. Typically, such BSR would indicate empty buffers at the UE 10. Performing such keep-alive signaling after a cell change to another cell, e.g., after the change to the cell 20-B in the scenario of FIG. 1, may trigger transfer of the context to the new cell 20-B and switching of the user plane data path, as described above. The keep alive-signaling may thus be treated in a similar manner as usual user plane traffic from the UE 10. In other scenarios, if no keep-alive signaling is used, the UE 10 may be switched to the idle state if the inactivity timer expires.

The multi-cell connected state, and the associated registration of the radio connection for the cell area, may be selected depending on various criteria. Such criteria may include a category of the UE 10 or capabilities of the UE 10. For example, the multi-cell connected state could be selected for semi-stationary UEs, as an alternative to the connected state. Further, the multi-cell connected state could be selected based on a subscription associated with the UE 10, e.g., based on subscription data indicated by the MME. Still further, the multi-cell connected state could be selected in response to an indication from the UE 10. Such indication may correspond to a parameter in the RRCConnectionRequest message or may be conveyed to the MME in conjunction with an Attach procedure. In the latter case the MME could inform the involved eNBs about the multi-cell connected state. Further, the behavior of the UE 10 could be monitored, e.g., in terms of traffic and mobility patterns, and the monitored behavior may be used as input for a learning process to determine one or more criteria for selecting the multi-cell connected state. For example, the eNBs and/or the MME could collect statistics about the UE 10 based on own observations and/or based on reports from the UE 10, such as statistics about mobility in idle mode. If the statistics are generated in a core network pat of the cellular network, it could be based on information collected during an entire Attach session or even consider different Attach sessions. In such scenarios, it may be beneficial to generate the statistics at a centralized node of the core network part which is able to collect information from multiple MMEs, e.g., at a HSS (Home Subscriber Server).

The multi-cell connected state may be used in conjunction with other mobility states, e.g., the connected state and/or the idle state, and switching between such different mobility states may for example be controlled by timers and/or event triggered. For example, the multi-cell connected state could be used as an intermediate state when switching from the connected state to the idle state or vice-versa. For instance, the cellular network and the UE 10 could be configured to trigger switching the UE 10 from the connected state to the multi-cell connected state in response to expiry of an inactivity timer associated with the connected state. Further, the cellular network and the UE 10 could be configured to switch from the multi-cell connected state to the idle state in response to expiry of an inactivity timer associated with the multi-cell connected state. For certain types of UE, it may also be beneficial to transit directly from the idle state to the multi-cell connected state, and never use the connected state.

Figure 2:
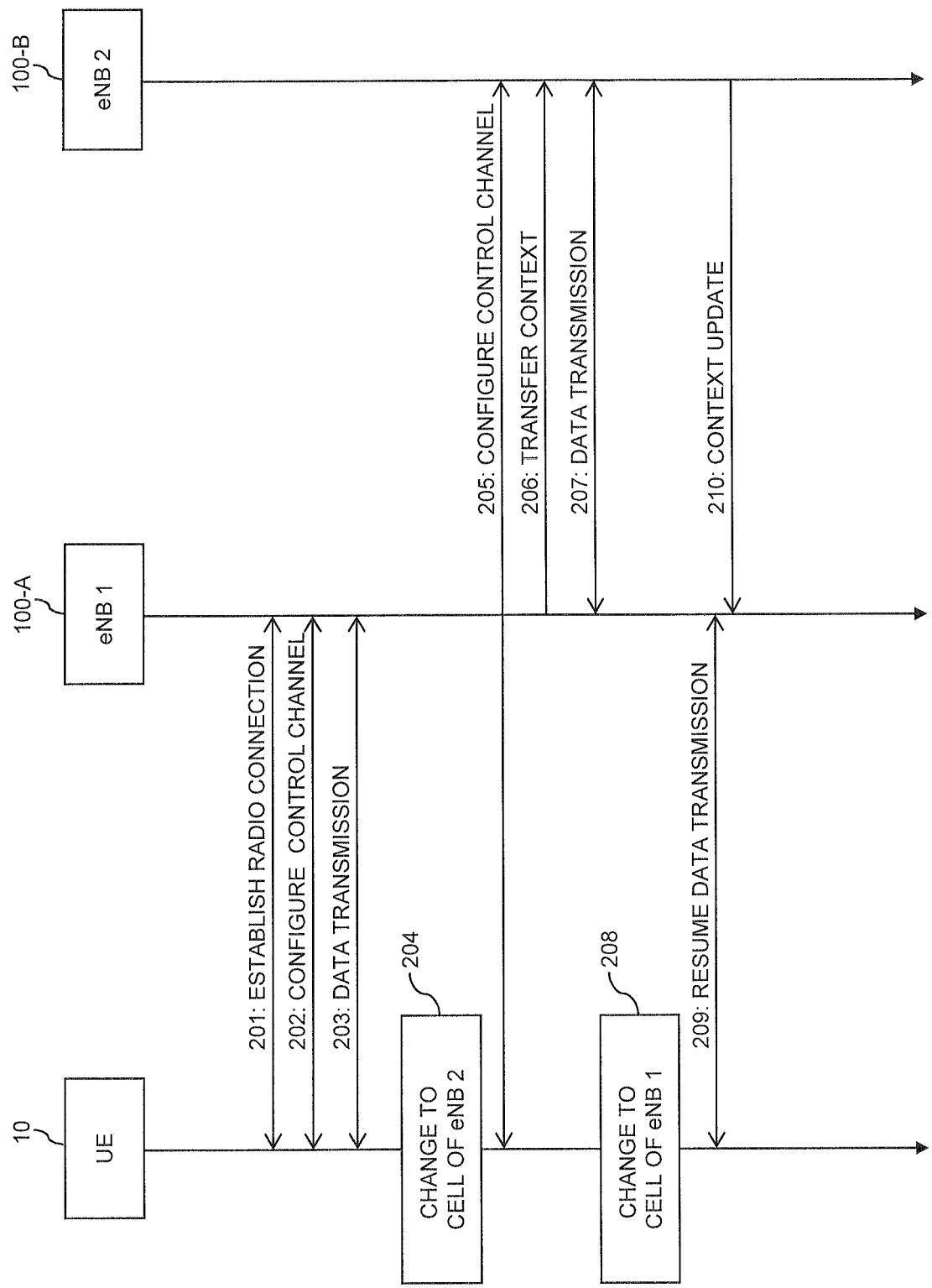
FIG. 2 shows an example of processes according to an embodiment of the invention, in which an optimized cell change is performed by a UE which returns to a previously visited cell.

FIG. 2 shows exemplary processes which may be used for performing a cell change in accordance with the above-described concepts. The processes of FIG. 2 involve the UE 10, the eNB 100-A, and the eNB 100-B.

In the processes of FIG. 2, the radio connection is established at 201 by the UE 10 and the eNB 100-A. At this stage, the UE 10 is connected to the cell 20-A served by the eNB 100-A. The radio connection is registered for a cell area which also includes the cell 20-B served by the eNB 100-B. The registration of the radio connection for the cell area may be performed during establishment of the radio connection or after establishment of the radio connection, e.g., when the UE 10 switches from the connected state to the multi-cell connected state, using RRC signaling between the UE 10 and the eNB 100-A or NAS signaling between the UE 10 and the MME (not illustrated in FIG. 1). The registration may involve configuring the UE 10 and the eNB 100-A with information about the radio connection and the associated cell area, e.g., in terms of cell identifiers. The registration may also involve configuring other nodes of the cellular network with such information about the radio connection and the associated cell area. For example, eNBs serving cells of the cell area, such as the eNB 100-B, may be configured with such information.

At 202, at least one control channel is configured by the UE 10 and the eNB 100-A. The configuration of the at least one control channel may be accomplished during or after establishment of the radio connection. The at least one control channel may include a PDCCH and a PUCCH of the cell 20-A served by the eNB 100-A. The configuration may for example involve assigning to the UE 10 a cell level identifier which allows for addressing control information transmitted on the at least one control channel to the UE 10. The cell level identifier may correspond to a C-RNTI, and the control information may include downlink assignments transmitted in DCI on the PDCCH. The configuration of the at least one control channel may also involve configuring the UE 10 with a Timing Advance. Further, the configuration of the control channel may also involve configuring opportunities for transmission of SRs on the PUCCH from the UE 10 to the eNB 100-A. The configuration may also involve a random access procedure performed by the UE 10 to access the cell 20-A served by the eNB 100-A.

As further illustrated at 203, data transmission on the radio connection may then be performed by the UE 10 and the eNB 100-A. This may involve transmitting downlink data on downlink radio resources allocated by a downlink assignment transmitted on the basis of the configuration of the at least one control channel determined at 202 and/or transmitting uplink data on uplink radio resources allocated by an uplink assignment transmitted on the basis of the configuration of the at least one control channel determined at 202.

At 204, the UE 10 changes to another cell of the cell area, in particular to the cell 20-B served by the eNB 100-B. This cell change is performed in response to an autonomous decision by the UE 10, without notifying the eNB 100-A of the cell change and without requiring transmission of a command from the cellular network to the UE 10 to trigger the cell change.

In the scenario illustrated by the processes of FIG. 2, the configuration determined at 202 is maintained after the change to the cell 20-B, by keeping corresponding information at the UE 10 and the eNB 100-A. Further, also at least a part of the context of the radio connection may be maintained after the change to the cell 20-B, by keeping corresponding information at the UE 10 and the eNB 100-A.

At 205, at least one control channel is configured by the UE 10 and the eNB 100-B. The configuration of the at least one control channel may be accomplished during or after establishment of the radio connection. The at least one control channel may include a PDCCH and a PUCCH of the cell 20-B served by the eNB 100-B. The configuration may for example involve assigning to the UE 10 a cell level identifier which allows for addressing control information transmitted on the at least one control channel to the UE 10. The cell level identifier may correspond to a C-RNTI, and the control information may include downlink assignments transmitted in DCI on the PDCCH. The configuration of the at least one control channel may also involve configuring the UE 10 with a Timing Advance. Further, the configuration of the control channel may also involve configuring opportunities for transmission of SRs on the PUCCH from the UE 10 to the eNB 100-B. The configuration may also involve a random access procedure performed by the UE 10 to access the cell 20-B served by the eNB 100-A.

The configuration of the control channel at 205 may for example be triggered by the UE 10 accessing the cell 20-B served by the eNB 100-B to resume transmission of the radio connection. In this case, the UE 10 may perform a random access procedure to gain access to the cell 20-B, and the configuration of the at least one control channel may be accomplished in the course of the random access procedure. The UE 10 may decide to access the cell 20-B in order to transmit uplink data on the radio connection. Further, if downlink data need to be transmitted to the UE 10 after the cell change of 204, the cellular network may first attempt to transmit the downlink data via the cell 20-A to the UE 10, and after failure of this transmission attempt, initiate paging of the UE 10 in the other cells of the cell area, thereby causing the UE 10 to respond in the cell 20-B by performing a random access procedure, in the course of which the configuration of the at least one control channel at 205 would be performed.

As further illustrated at 206, in response to detecting that the UE 10 changed to the cell 20-B served by the eNB 100-B, the context of the radio connection is transferred to the eNB 100-B. On the basis of the transferred context, transmission on the radio connection may be resumed by the UE 10 and the eNB 100-B, as illustrated at 207. The resumed transmission may involve transmitting downlink data on downlink radio resources allocated by a downlink assignment transmitted on the basis of the configuration of the at least one control channel determined at 205 and/or transmitting uplink data on uplink radio resources allocated by an uplink assignment transmitted on the basis of the configuration of the at least one control channel determined at 205.

At 208, the UE 10 changes back to the cell 20-A served by the eNB 100-A. This cell change is again performed in response to an autonomous decision by the UE 10, without notifying the eNB 100-A of the cell change and without requiring transmission of a command from the cellular network to the UE 10 to trigger the cell change.

After the cell change back to the cell 20-A, the UE 10 may directly resume transmission on the radio connection utilizing the maintained configuration of the at least one control channel of the cell 20-A, as illustrated at 209. For example, the UE 10 could utilize the maintained configuration to send a SR on the PUCCH of the cell 20-A or to receive a downlink assignment on the PDCCH of the cell 20-A and then to send or receive data on the corresponding allocated radio resources of the cell 20-A. For resuming the transmission at 209 also the maintained part of the context may be utilized. However, a dynamically varying part of the context, e.g., a PDCP status, may also be updated on the basis of information provided by the eNB 100-B, as indicated by 210.

As can be seen, in the processes of FIG. 2 configurations which facilitate access of the UE 10 to the cells of the cell area may be successively learned as the UE 10 moves within the cell area. In other scenarios, such configurations may at least in part be prepared already when establishing the radio connection or when registering the radio connection for the cell area. An example of corresponding processes is illustrated by FIG. 3.

Figure 3:
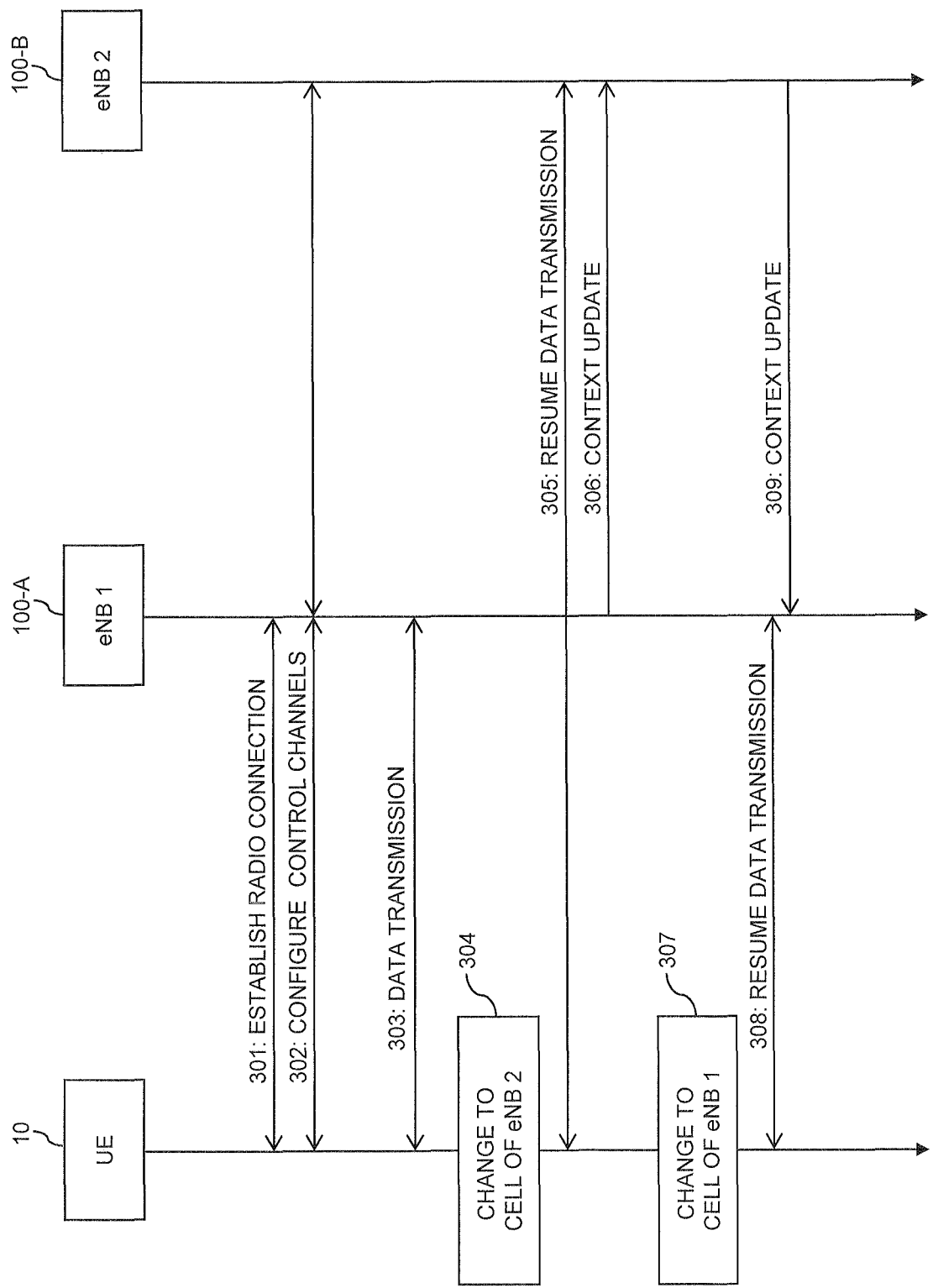
FIG. 3 shows an example of processes according to an embodiment of the invention, in which a configuration of control channels for an optimized cell change is performed when establishing a radio connection between a UE and a cellular network.

The processes of FIG. 3 involve the UE 10, the eNB 100-A, and the eNB 100-B. In the processes of FIG. 3, the radio connection is established at 301 by the UE 10 and the eNB 100-A. At this stage, the UE 10 is connected to the cell 20-A served by the eNB 100-A. The radio connection is registered for a cell area which also includes the cell 20-B served by the eNB 100-B. The registration of the radio connection for the cell area may be performed during establishment of the radio connection or after establishment of the radio connection, e.g., when the UE 10 switches from the connected state to the multi-cell connected state, using RRC signaling between the UE 10 and the eNB 100-A or NAS signaling between the UE 10 and the MME (not illustrated in FIG. 1). The registration may involve configuring the UE 10 and the eNB 100-A with information about the radio connection and the associated cell area, e.g., in terms of cell identifiers. The registration may also involve configuring other nodes of the cellular network with such information about the radio connection and the associated cell area. For example, eNBs serving cells of the cell area, such as the eNB 100-B, may be configured with such information.

At 303, control channels are configured by the UE 10, the eNB 100-A, and the eNB 100-B. Specifically, such control channels may be configured for multiple cells of the cell area, or even for all cells of the cell area. In the illustrated scenario, at least one control channel is configured for the cell 20-A and at least one control channel is configured for the cell 20-B. The configuration of the control channels may be accomplished during or after establishment of the radio connection. The control channels may include a PDCCH and a PUCCH of the cell 20-A served by the eNB 100-A and a PDCCH and a PUCCH of the cell 20-B served by the eNB 100-B. The configuration may for example involve assigning to the UE 10 a cell level identifier which allows for addressing control information transmitted on the at least one control channel to the UE 10. The cell level identifier may correspond to a C-RNTI, and the control information may include downlink assignments transmitted in DCI on the PDCCH of the respective cell 20-A, 20-B. The configuration may also involve configuring the UE 10 with a Timing Advance for the respective cell 20-A, 20-B. Further, the configuration of the control channel may also involve configuring opportunities for transmission of SRs on the PUCCH of the cell 20-A from the UE 10 to the eNB 100-A and configuring opportunities for transmission of SRs on the PUCCH of the cell 20-B from the UE 10 to the eNB 100-B. In the case of the cell 20-A, the configuration may be performed by radio signaling between the UE 10 and the eNB 100-A, e.g., in a random access procedure performed by the UE 10 to access the cell 20-A. In the case of the cell 20-B, such direct radio signaling may not be possible and the configuration of the at least one control channel for the cell 20-B may be based on signaling mediated by the eNB 100-A, and optionally also a further node, such as the MME.

When configuring the control channels at 303, also a context for the radio connection may be prepared for each of the involved cells 20-A, 20-B.

As further illustrated at 303, data transmission on the radio connection may then be performed by the UE 10 and the eNB 100-A. This may involve transmitting downlink data on downlink radio resources allocated by a downlink assignment transmitted on the basis of the configuration of the at least one control channel determined at 303 and/or transmitting uplink data on uplink radio resources allocated by an uplink assignment transmitted on the basis of the configuration of the at least one control channel determined at 302.

At 304, the UE 10 changes to another cell of the cell area, in particular to the cell 20-B served by the eNB 100-B. This cell change is performed in response to an autonomous decision by the UE 10, without notifying the eNB 100-A of the cell change and without requiring transmission of a command from the cellular network to the UE 10 to trigger the cell change.

As illustrated at 305, after the cell change to the cell 20-B, the UE 10 may directly resume transmission on the radio connection utilizing the configuration of the at least one control channel of the cell 20-B as determined beforehand at 302. For example, the UE 10 could utilize the configuration to send a SR on the PUCCH of the cell 20-B or to receive a downlink assignment on the PDCCH of the cell 20-B and then to send or receive data on the corresponding allocated radio resources of the cell 20-B. For resuming the transmission at 305 also the previously prepared context of the radio connection may be utilized. However, a dynamically varying part of the context, e.g., a PDCP status, may also be updated on the basis of information provided by the eNB 100-A, as indicated by 306.

At 307, the UE 10 changes back to the cell 20-A served by the eNB 100-A. This cell change is again performed in response to an autonomous decision by the UE 10, without notifying the eNB 100-A of the cell change and without requiring transmission of a command from the cellular network to the UE 10 to trigger the cell change.

As illustrated at 308, after the cell change back to the cell 20-A, the UE 10 may again directly resume transmission on the radio connection utilizing the configuration of the at least one control channel of the cell 20-A determined beforehand at 302. For example, the UE 10 could utilize the configuration to send a SR on the PUCCH of the cell 20-A or to receive a downlink assignment on the PDCCH of the cell 20-A and then to send or receive data on the corresponding allocated radio resources of the cell 20-A. For resuming the transmission at 308 also the previously prepared context of the radio connection may be utilized. However, a dynamically varying part of the context, e.g., a PDCP status, may also be updated on the basis of information provided by the eNB 100-A, as indicated by 309.

As can be seen, in the processes of FIG. 3 configurations which facilitate access of the UE 10 to the cells of the cell area may be prepared beforehand when establishing the radio connection or when registering the radio connection for the cell area, thereby allowing for minimizing signaling overhead associated with cell changes in the cell area.

It is to be understood that the principles illustrated by FIGS. 2 and 3 could also be applied in combination by preparing configurations for some cells of the cell area already at an initial stage, e.g., when establishing the radio connection or when registering the radio connection for the cell area, while for other cells of the cell area the configuration may be learned when the UE 10 moves to the cell.

Figure 4:
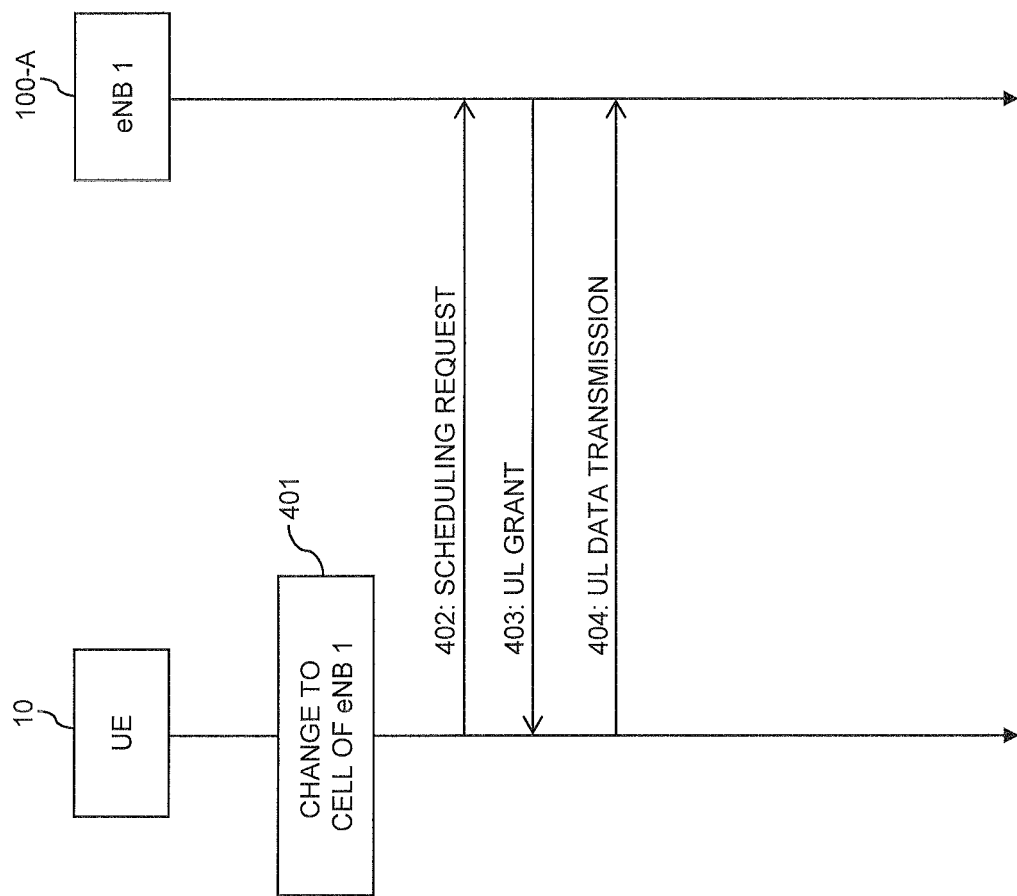
FIG. 4 shows an example of processes according to an embodiment of the invention, in which a UE initiates access to a new cell after a cell change of the UE.

FIG. 4 shows an example of processes which may be performed when resuming transmission on the radio connection after a cell change, e.g., as part of the processes of FIG. 2 or 3. The processes of FIG. 4 involve the UE 10 and the eNB 100-A.

At 401, the UE 10 changes to the cell 20-A served by the eNB 100-A. This cell change is assumed to be accomplished from another cell of the cell area, e.g., from the cell 20-B served by the eNB 100-B. As explained above, the cell change is performed in response to an autonomous decision by the UE 10, without notifying the cellular network of the cell change and without requiring transmission of a command from the cellular network to the UE 10 to trigger the cell change.

In the example of FIG. 4, it is assumed that a configuration was prepared beforehand in the UE 10 and the eNB 100-A which allows performing allocation of radio resources via a control channel of the cell 20-A. The configuration being prepared beforehand means that the configuration is determined already before the UE 10 decides to perform the cell change. For example, the configuration may have been determined when establishing the radio connection or when registering the radio connection for the cell area. Further, the configuration may have been determined when the UE 10 previously visited the cell 20-A.

In the scenario of FIG. 4, it is assumed that the configuration includes at least a C-RNTI assigned to the UE 10 for the cell 20-A, a valid Timing Advance for the cell 20-A, and SR opportunities on the PUCCH of the cell 20-A.

After the cell change at 401, the UE 10 may use the prepared configuration for resuming transmission on the radio connection by sending a SR 402 on a configured SR opportunity to the eNB 100-A, receiving an UL (uplink) grant 403 in DCI on the PDCCH of the cell 20-A, which is addressed to the UE 10 by the C-RNTI assigned to the UE 10 for the cell 20-A, and then performing an UL data transmission 404 on uplink radio resources indicated by the UL grant 403.

Figure 5:
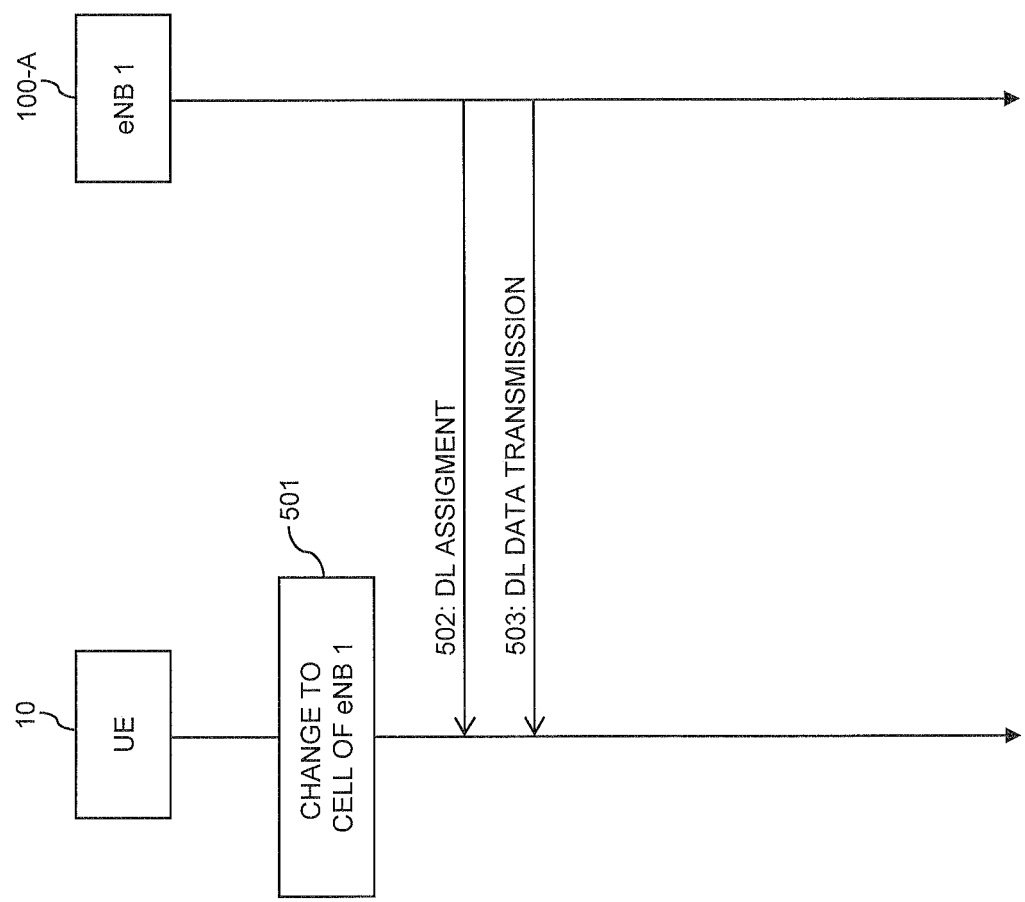
FIG. 5 shows an example of processes according to an embodiment of the invention, in which a RAN node initiates access of a UE to a new cell after a cell change of the UE.

FIG. 5 shows an example of processes which may be performed when resuming transmission on the radio connection after a cell change, e.g., as part of the processes of FIG. 2 or 3. The processes of FIG. 5 involve the UE 10 and the eNB 100-A.

At 501, the UE 10 changes to the cell 20-A served by the eNB 100-A. This cell change is assumed to be accomplished from another cell of the cell area, e.g., from the cell 20-B served by the eNB 100-B. As explained above, the cell change is performed in response to an autonomous decision by the UE 10, without notifying the cellular network of the cell change and without requiring transmission of a command from the cellular network to the UE 10 to trigger the cell change.

In the example of FIG. 5, it is assumed that a configuration was prepared beforehand in the UE 10 and the eNB 100-A which allows performing allocation of radio resources via a control channel of the cell 20-A. The configuration being prepared beforehand means that the configuration is determined already before the UE 10 decides to perform the cell change. For example, the configuration may have been determined when establishing the radio connection or when registering the radio connection for the cell area. Further, the configuration may have been determined when the UE 10 previously visited the cell 20-A.

In the scenario of FIG. 5, it is assumed that the configuration includes at least a C-RNTI assigned to the UE 10 for the cell 20-A and a valid Timing Advance for the cell 20-A.

After the cell change at 501, the prepared configuration may be used for resuming transmission on the radio connection by the eNB sending a DL (downlink) assignment 502 in DCI on the PDCCH of the cell 20-A, which is addressed to the UE 10 by the C-RNTI assigned to the UE 10 for the cell 20-A, and then performing a DL (downlink) data transmission 503 on downlink radio resources indicated by the DL assignment 502.

In the case of the procedures of FIG. 5, the cellular network may assume that the UE 10 can be reached by the DL data transmission 503. However, due to the cell change 501 not being notified to the cellular network, this assumption may turn out to be incorrect. This may be detected by the eNB 100-A on the basis of missing feedback for the DL data transmission 503, e.g., missing feedback of a HARQ or RLC feedback mechanism. When detecting such failure, the eNB 100-A may react by initiating paging of the UE 10 in other cells of the cell area, e.g., as explained below in connection with FIG. 6.

Figure 6:
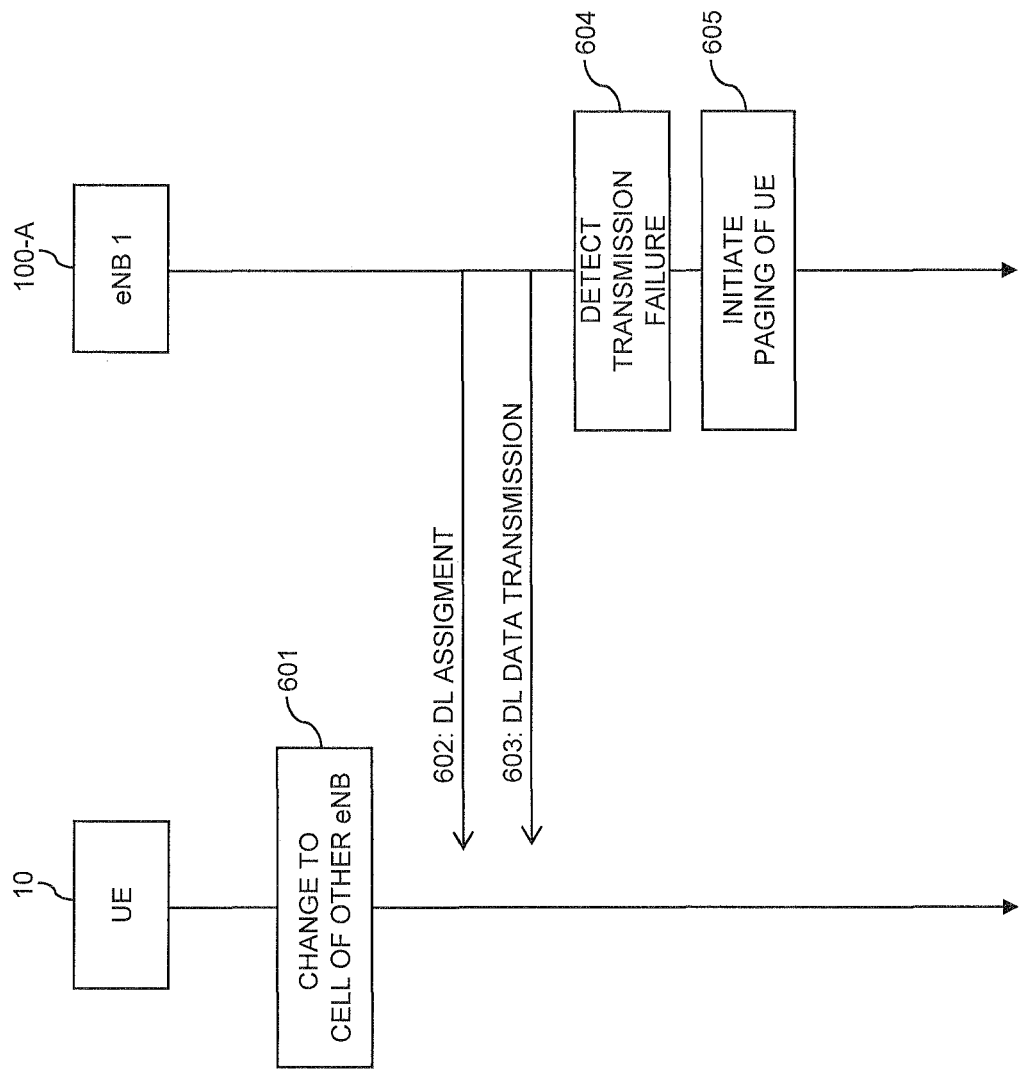
FIG. 6 shows an example of processes according to an embodiment of the invention, in which a RAN node initiates paging of a UE after a cell change of the UE.

FIG. 6 shows an example of processes which may be performed when resuming transmission on the radio connection after a cell change, e.g., as part of the processes of FIG. 2 or 3. The processes of FIG. 6 involve the UE 10 and the eNB 100-A.

At 601, the UE 10 changes from the cell 20-A served by the eNB 100-A to another cell of the cell area, e.g., to the cell 20-B served by the eNB 100-B. As explained above, the cell change is performed in response to an autonomous decision by the UE 10, without notifying the cellular network of the cell change and without requiring transmission of a command from the cellular network to the UE 10 to trigger the cell change.

After the cell change at 601, the cellular network attempts a downlink data transmission to the UE 10, assuming that the UE 10 still can be reached via the cell 20-A. In the illustrated example, this means that the eNB 100-A sends a DL assignment 602 in DCI on the PDCCH of the cell 20-A, which is addressed to the UE 10 by the C-RNTI assigned to the UE 10 for the cell 20-A, and then performs a DL data transmission 603 on downlink radio resources indicated by the DL assignment 602. However, as illustrated in FIG. 6, neither the DL assignment 602 nor the DL data transmission 603 reach the UE 10, because the UE 10 has changed to the other cell.

At 604, failure of the DL data transmission is detected by the eNB 100-A, e.g., based on missing HARQ feedback for the DL data transmission 603.

At 605, the eNB 100-A reacts to the failure by initiating paging of the UE 10 in other cells of the cell area. In some scenarios, the eNB 100-A may issue corresponding control information towards eNBs serving these other cells. Alternatively or in addition, the paging may be initiated via the MME.

Figure 7:
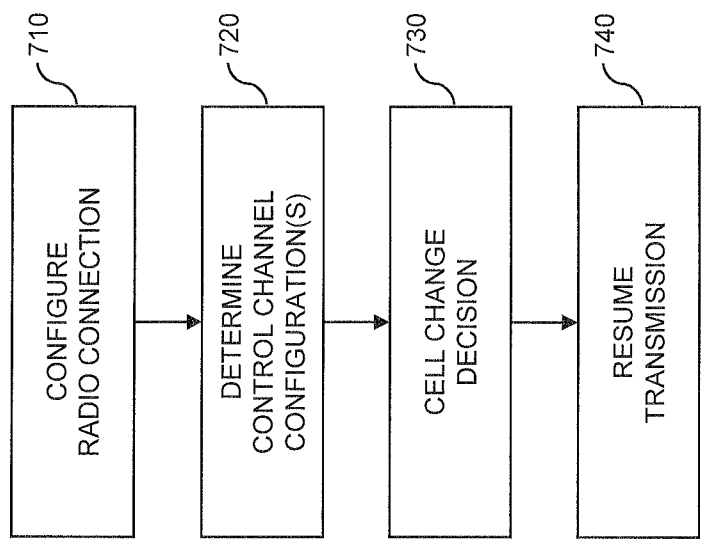
FIG. 7 shows a flowchart for illustrating a method according to an embodiment of the invention, which may be implemented by a radio device.

FIG. 7 shows a flowchart for illustrating a method of controlling radio transmission in a cellular network. The method may be used for implementing the above-described concepts in a radio device, such as the UE 10. If a processor based implementation of the radio device is used, the steps of the method may be performed by one or more processors of the radio device, or the one or more processors of the radio device may control the radio device in such a way that the radio device performs the method. For this purpose, the processor(s) may execute correspondingly configured program code. Further, at least some of the corresponding functionalities may be hardwired in the processor(s).

At step 710, the radio device configures a radio connection. The radio connection is registered for a cell area which includes at least for a first cell and a second cell of the cellular network.

At step 720, the radio device determines a configuration which enables performing allocation of radio resources to the radio device via a control channel of the second cell. This is accomplished before a decision of the radio device to perform a change from the first cell to the second cell. The first cell is thus a source cell of the cell change and the second cell is a target cell of the cell change. The determination may thus be performed in preparation for the possibility that the radio device decides to perform the change. The determination of the configuration can be performed already when establishing the radio connection or when registering the radio connection for the cell area, such as explained in connection with the example of FIG. 3. Further, the determination of the configuration can be performed while the radio device is located in the second cell during a previous visit, such as explained in connection with the example of FIG. 2. In some scenarios, the radio device may determine multiple such configurations, each associated with a corresponding cell of the cell area. The configuration may for example include a cell-level identifier of the radio device, e.g., a C-RNTI, a Timing Advance, and/or a configuration of SR opportunities for the radio device.

At step 730, the radio device decides to perform the change to the second cell. As noted above, this may be accomplished without requiring measurement reporting to the cellular network or a triggering command from the cellular network. Further, the radio device may perform the change to the second cell without notifying the cellular network of the change.

At step 740, after the change of the radio device from the first cell to the second cell, the radio device resumes transmission on the radio connection by requesting allocation of radio resources of second cell based on the configuration determined at step 720. This may involve sending a SR, receiving an uplink grant indicating uplink radio resources of the second cell or receiving a downlink assignment indicating downlink radio resources of the second cell.

In some scenarios, the radio device may maintain a configuration which enables performing allocation of radio resources to the radio device via a control channel of the first cell, for example as determined at step 720, after the change from the first cell to the second cell. This configuration may then be used by the radio device for resuming transmission on the radio connection when later returning to the first cell.

In some scenarios, the radio device may also receive information concerning the cell area from the cellular network, e.g., when establishing the radio connection or when registering the radio connection for the cell area. For example, the information concerning the cell area may include identifiers of the cells of the cell area and/or identifiers of RAN nodes serving the cells of the cell area. In some scenarios, the radio device may also otherwise derive information concerning the cell area, e.g., from and identity of the cell via which the radio device is currently connected to the cellular network and rules configured in the radio device. The information concerning the cell area may also indicate one or more cells of the cell area, which are selectable as the second cell, whereas after a change to another cell of the cell area the radio device resumes transmission on the radio connection by performing a random access procedure before requesting allocation of radio resources of other cell. In other words, the cell area may include cells for which the configuration which enables performing allocation of radio resources to the radio device via a control channel of the cell is prepared beforehand to facilitate access to such cells, while for other cells other access methods are applied when resuming transmission on the radio connection after a change to such cell.

In some scenarios, the radio device may store context data of the radio connection. The process of resuming transmission on the radio connection of step 740 may then also be based on the stored context data of the radio connection. For example, such context data may include a PDCP status of the radio connection, e.g. PDCP sequence numbers. Further, the context data may also include uplink data to be transmitted to the cellular network.

In view of the above-described functionalities, a radio device for implementing the illustrated concepts may be provided with a module configured to configure radio connection registered for a cell area, such as explained in connection with step 710, a module configured to determine a configuration of a control channel, such as explained in connection with step 720, a module configured to decide to perform a cell change an perform such cell change, such as explained in connection with step 730, and a module configured to resume transmission on the radio connection after the cell change, such as explained in connection with step 740. Further, the radio device may be provided with one or more further modules configured to perform any further operations associated with functionalities as described above.

Figure 8:
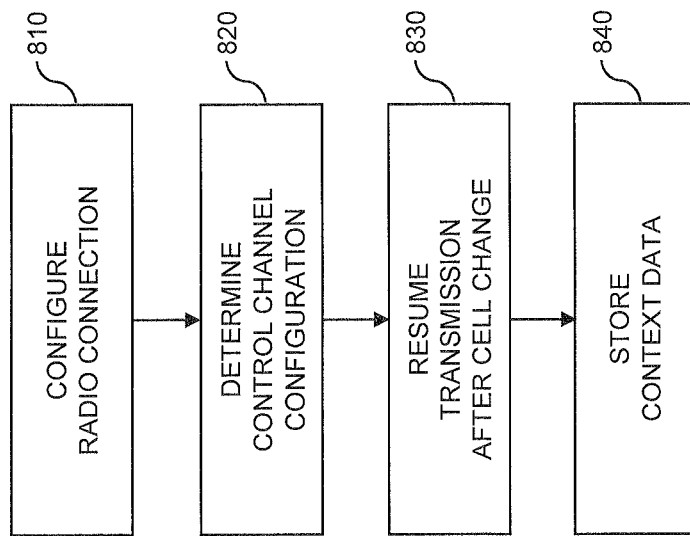
FIG. 8 shows a flowchart for illustrating a further method according to an embodiment of the invention, which may be implemented by a RAN node serving a target cell of a cell change.

FIG. 8 shows a flowchart for illustrating a method of controlling radio transmission in a cellular network. The method may be used for implementing the above-described concepts in a RAN node of the cellular network, such as one of the above-mentioned eNBs 100-A, 100-B, 100-C, 100-D, 100-E. If a processor based implementation of the RAN node is used, the steps of the method may be performed by one or more processors of the RAN node, or the one or more processors of the RAN node may control the RAN node in such a way that the radio device performs the method. For this purpose, the processor(s) may execute correspondingly configured program code. Further, at least some of the corresponding functionalities may be hardwired in the processor(s).

At step 810, the RAN node configures a radio connection between a radio device, e.g., the UE 10, and the cellular network. The radio connection is registered for a cell area comprising at least a first cell and a second cell of the cellular network. The second cell is served by the RAN node.

At step 820, before a decision of the radio device to perform a change from the first cell to the second cell, the RAN node determines a configuration which enables performing allocation of radio resources to the radio device via a control channel of the second cell. The configuration may for example include a cell-level identifier of the radio device, e.g., a C-RNTI, a Timing Advance, and/or a configuration of SR opportunities for the radio device. The determination of the configuration can be performed already when establishing the radio connection or when registering the radio connection for the cell area, such as explained in connection with the example of FIG. 3. Further, the determination of the configuration can be performed while the radio device is located in the second cell during a previous visit, such as explained in connection with the example of FIG. 2.

At step 830, after a change of the radio device from the first cell to the second cell, the RAN node resumes transmission on the radio connection by performing allocation of radio resources of the second cell to the radio device based on the determined configuration. This may involve receiving a SR, sending an uplink grant indicating uplink radio resources of the second cell or sending a downlink assignment indicating downlink radio resources of the second cell. The first cell is a source cell of the cell change and the second cell is a target cell of the cell change.

In some scenarios, the RAN node may maintain the determined configuration after a change of the radio device from the second cell to another cell of the cell area. This configuration may then be used by the RAN node for resuming transmission on the radio connection when the radio device later returning to the second cell.

In some scenarios, the radio device may also transmit information concerning the cell area to the radio device, e.g., when establishing the radio connection or when registering the radio connection for the cell area. For example, the information concerning the cell area may include identifiers of the cells of the cell area and/or identifiers of RAN nodes serving the cells of the cell area. The information concerning the cell area may also indicate one or more cells of the cell area, which are selectable as the second cell, whereas after a change to another cell of the cell area the radio device resumes transmission on the radio connection by performing a random access procedure before requesting allocation of radio resources of other cell. In other words, the cell area may include cells for which the configuration which enables performing allocation of radio resources to the radio device via a control channel of the cell is prepared beforehand to facilitate access to such cells, while for other cells other access methods are applied when resuming transmission on the radio connection after a change to such cell.

At step 840, the RAN node may store context data of the radio connection. For example, the RAN node may obtain the context data in response to a change of the radio device to the second cell. Further, the RAN node may generate the context data when the radio connection is established or when the radio connection is established for the cell area. For example, such context data may include a PDCP status of the radio connection, e.g. PDCP sequence numbers. Further, the context data may also include uplink data to be transmitted to the cellular network. If such context data are stored by the RAN node, they may also be used in the process of resuming transmission on the radio connection.

In view of the above-described functionalities, a RAN node for implementing the illustrated concepts may be provided with a module configured to configure radio connection registered for a cell area, such as explained in connection with step 810, a module configured to determine a configuration of a control channel, such as explained in connection with step 820, and a module configured to resume transmission on the radio connection after the cell change, such as explained in connection with step 830, and a module configured to store context data associated with the radio connection, such as explained in connection with step 840. Further, the RAN node may be provided with one or more further modules configured to perform any further operations associated with functionalities as described above.

Figure 9:
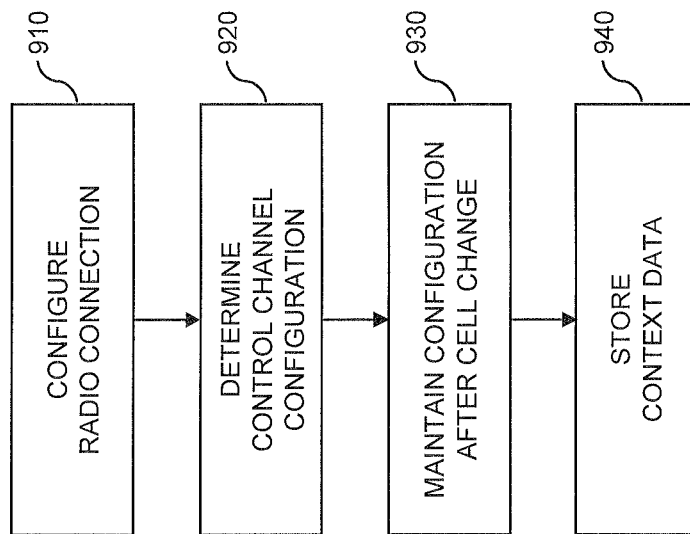
FIG. 9 shows a flowchart for illustrating a further method according to an embodiment of the invention, which may be implemented by a RAN node serving a source cell of a cell change.

FIG. 9 shows a flowchart for illustrating a method of controlling radio transmission in a cellular network. The method may be used for implementing the above-described concepts in a RAN node of the cellular network, such as one of the above-mentioned eNBs 100-A, 100-B, 100-C, 100-D, 100-E. If a processor based implementation of the RAN node is used, the steps of the method may be performed by one or more processors of the RAN node, or the one or more processors of the RAN node may control the RAN node in such a way that the radio device performs the method. For this purpose, the processor(s) may execute correspondingly configured program code. Further, at least some of the corresponding functionalities may be hardwired in the processor(s).

At step 910, the RAN node configures a radio connection between a radio device, e.g., the UE 10, and the cellular network. The radio connection is registered for a cell area comprising at least a first cell and a second cell of the cellular network. The first cell is served by the RAN node.

At step 920, the RAN node determines a configuration which enables performing allocation of radio resources to the radio device via a control channel of the first cell. The configuration may for example include a cell-level identifier of the radio device, e.g., a C-RNTI, a Timing Advance, and/or a configuration of SR opportunities for the radio device. The determination of the configuration can be performed already when establishing the radio connection or when registering the radio connection for the cell area, such as explained in connection with the example of FIG. 3. Further, the determination of the configuration can be performed while the radio device is located in the first cell, such as explained in connection with the example of FIG. 2.

At step 930, after a change of the radio device from the first cell to the second cell, the RAN node maintains the configuration determined at step 920. The first cell is thus a source cell of the cell change and the second cell is a target cell of the cell change. The maintained configuration may then be used by the RAN node for resuming transmission on the radio connection when the radio device later returning to the first cell. In particular, the RAN node may then resume transmission on the radio connection by performing allocation of radio resources of the first cell to the radio device based on the determined configuration. This may involve receiving a SR, sending an uplink grant indicating uplink radio resources of the first cell or sending a downlink assignment indicating downlink radio resources of the first cell.

In some scenarios, the radio device may also transmit information concerning the cell area to the radio device, e.g., when establishing the radio connection or when registering the radio connection for the cell area. For example, the information concerning the cell area may include identifiers of the cells of the cell area and/or identifiers of RAN nodes serving the cells of the cell area. The information concerning the cell area may also indicate one or more cells of the cell area, which are selectable as the second cell, whereas after a change to another cell of the cell area the radio device resumes transmission on the radio connection by performing a random access procedure before requesting allocation of radio resources of other cell. In other words, the cell area may include cells for which the configuration which enables performing allocation of radio resources to the radio device via a control channel of the cell is prepared beforehand to facilitate access to such cells, while for other cells other access methods are applied when resuming transmission on the radio connection after a change to such cell.

At step 940, the RAN node may store context data of the radio connection. For example, the RAN node may obtain the context data in response to a change of the radio device to the first cell. Further, the RAN node may generate the context data when the radio connection is established or when the radio connection is established for the cell area. For example, such context data may include a PDCP status of the radio connection, e.g. PDCP sequence numbers. Further, the context data may also include uplink data to be transmitted to the cellular network. If such context data are stored by the RAN node, they may also be used in the process of resuming transmission on the radio connection. Similar to the configuration which enables allocation of radio resources of the first cell via the control channel, the context data may be maintained after the radio device changes to the second cell. In this way resuming transmission on the radio connection when the radio device returns to the first cell may be facilitated.

In view of the above-described functionalities, a RAN node for implementing the illustrated concepts may be provided with a module configured to configure radio connection registered for a cell area, such as explained in connection with step 910, a module configured to determine a configuration of a control channel, such as explained in connection with step 920, and a module configured maintain the determined configuration after a cell change, such as explained in connection with step 930, and a module configured to store context data associated with the radio connection, such as explained in connection with step 940. Further, the RAN node may be provided with one or more further modules configured to perform any further operations associated with functionalities as described above.

It should be noted that the above concepts may also be implemented in a system including at least two of a radio device operating according to the method of FIG. 7, a RAN node operating according to the method of FIG. 8, and a RAN node operating according to the method of FIG. 9.

Figure 10:
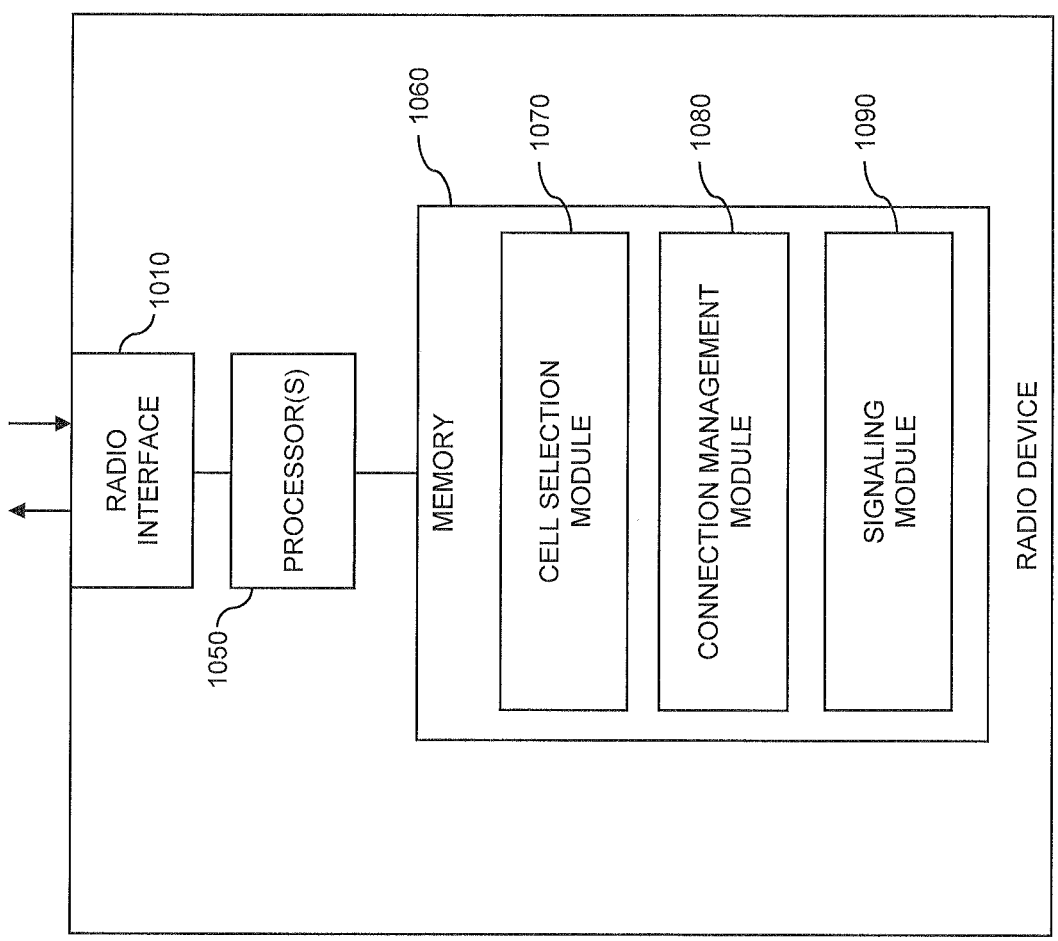
FIG. 10 schematically illustrates structures of a radio device according to an embodiment of the invention.

FIG. 10 illustrates exemplary structures which may be used for implementing the above concepts in a radio device, e.g., the UE 10.

As illustrated, the radio device may include a radio interface 1010 for connecting to a cellular network. The radio interface 1010 may be utilized for establishing the above-mentioned radio connection registered for the cell area, for performing transmissions on this radio connection, and for using the control channel(s) associated with this radio connection.

Further, the radio device includes one or more processors 1050 coupled to the radio interface 1010, and a memory 1060 coupled to the processor(s) 1050. The memory 1060 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 1060 includes suitably configured program code to be executed by the processor(s) 1050 so as to implement the above-described functionalities of a radio device. In particular, the memory 1060 may include various program code modules for causing the radio device to perform processes as described above, e.g., corresponding to the method steps of FIG. 7. As illustrated, the memory 1060 may include a cell selection module 1070 for implementing the above-described functionalities of deciding and performing a cell change with the cell area, e.g., as explained in connection with step 730 of FIG. 7. Further, the memory 1060 may include a connection management module 1080 for implementing the above-described functionalities of determining and maintaining configurations associated with control channels of the radio connection, such as explained in connection with step 720 of FIG. 7. Further, the memory 1060 may include a signaling module 1090 for implementing the above-described functionalities of receiving information concerning the cell area or sending information which enables resuming of transmission on the radio connection.

It is to be understood that the structures as illustrated in FIG. 10 are merely schematic and that the radio device may actually include further components which, for the sake of clarity, have not been illustrated, e.g., further interfaces or processors. Also, it is to be understood that the memory 1060 may include further types of program code modules, which have not been illustrated, e.g., program code modules for implementing known functionalities of a radio device, such as of a UE supporting the LTE radio technology. According to some embodiments, also a computer program may be provided for implementing functionalities of the radio device, e.g., in the form of a physical medium storing the program code and/or other data to be stored in the memory 1060 or by making the program code available for download or by streaming.

FIG. 10 illustrates exemplary structures which may be used for implementing the above concepts in a RAN node, e.g., one of the eNBs 100-A, 100-B, 100-C, 100-D.

As illustrated, the RAN node may include a radio interface 1110 for connecting to a radio device, e.g., the UE 10. The radio interface 1110 may be utilized for establishing the above-mentioned radio connection registered for the cell area, for performing transmissions on this radio connection, and for using the control channel(s) associated with this radio connection.

Further, the RAN node includes one or more processors 1150 coupled to the radio interface 1110, and a memory 1160 coupled to the processor(s) 1150. The memory 1160 may include a ROM, e.g., a flash ROM, a RAM, e.g., a DRAM or SRAM, a mass storage, e.g., a hard disk or solid state disk, or the like. The memory 1160 includes suitably configured program code to be executed by the processor(s) 1150 so as to implement the above-described functionalities of a radio device. In particular, the memory 1160 may include various program code modules for causing the radio device to perform processes as described above, e.g., corresponding to the method steps of FIG. 8 and/or 9. As illustrated, the memory 1160 may include an access control module 1170 for implementing the above-described functionalities of managing access of the radio device to the cell served by the RAN node, e.g., by allocation of radio resources or performing a random access procedure if needed. Further, the memory 1160 may include a connection management module 1180 for implementing the above-described functionalities of determining and maintaining configurations associated with control channels of the radio connection, such as explained in connection with step 820 of FIG. 8 or step 920 of FIG. 9. Further, the memory 1160 may include a signaling module 1190 for implementing the above-described functionalities of sending information concerning the cell area or sending information which enables resuming of transmission on the radio connection.

Figure 11:
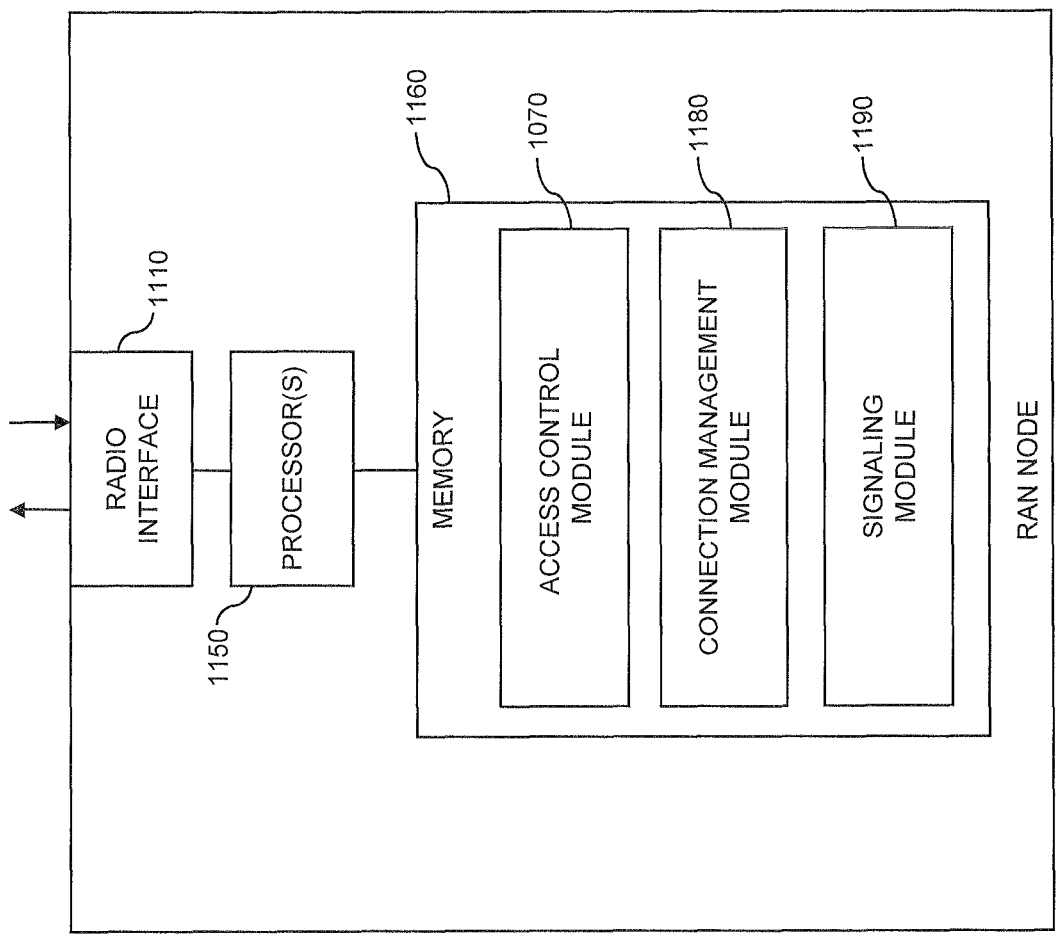
FIG. 11 schematically illustrates structures of a RAN node according to an embodiment of the invention.

It is to be understood that the structures as illustrated in FIG. 11 are merely schematic and that the RAN node may actually include further components which, for the sake of clarity, have not been illustrated, e.g., further interfaces or processors. Also, it is to be understood that the memory 1160 may include further types of program code modules, which have not been illustrated, e.g., program code modules for implementing known functionalities of a RAN node, such as of an eNB of the LTE radio technology. According to some embodiments, also a computer program may be provided for implementing functionalities of the RAN node, e.g., in the form of a physical medium storing the program code and/or other data to be stored in the memory 1160 or by making the program code available for download or by streaming.

As can be seen, the concepts as described above may be used for efficiently controlling radio transmissions by a radio device which changes cells typically only in a limited cell area, e.g., a semi-stationary UE. By means of the concepts, the radio connection may be maintained even if the UE changes to another cell of the cell area, without requiring excessive signaling associated with measurement reporting or network controlled handover processes.

It is to be understood that the examples and embodiments as explained above are merely illustrative and susceptible to various modifications. For example, while the solution has been described in connection with the LTE radio technology, it could also be applied in connection with other radio technologies, e.g., a 3G radio technology such as the UMTS (Universal Mobile Telecommunications System) radio technology or a 5G radio technology, e.g., based on an evolution of the LTE radio technology using beamforming or other enhancements. In such other radio technologies, control channels or RAN nodes having other designations may be used. Further, the illustrated nodes may be implemented by a single device or by a system of multiple devices. Moreover, it is to be understood that the above concepts may be implemented by using correspondingly designed software to be executed by one or more processors of an existing device, or by using dedicated device hardware.

The invention claimed is:

1. A method of controlling radio transmission in a cellular network, the method comprising:
configuring, using a radio device, a radio connection between the radio device and the cellular network, the radio connection being registered for a cell area comprising at least a first cell and a second cell of the cellular network;
before a decision of the radio device to perform a change from the first cell to the second cell, the radio device determining a configuration which enables performing allocation of radio resources to the radio device via a control channel of the second cell, the determined configuration comprising at least one of a timing advance and a configuration of scheduling request opportunities for the radio device;
after the change of the radio device from the first cell to the second cell, the radio device resuming transmission on the radio connection by requesting allocation of radio resources of the second cell based on the determined configuration;
after the change from the first cell to the second cell, the radio device maintaining a configuration which enables performing allocation of radio resources to the radio device via a control channel of the first cell; and
determining the configuration which enables performing allocation of radio resources to the radio device via the control channel of the first cell and the configuration which enables performing allocation of radio resources to the radio device via the control channel of the second cell when establishing the radio connection.

2. The method according to claim 1, wherein the configuration which enables performing allocation of radio resources to the radio device via the control channel of the second cell is determined when establishing the radio connection.

3. The method according to claim 1, wherein the configuration which enables performing allocation of radio resources to the radio device via the control channel of the second cell is determined before the decision to perform the change from the first cell to the second cell, while the radio device is located in the second cell.

4. The method according to claim 1, wherein the radio device receives information concerning the cell area from the cellular network, and wherein the information concerning the cell area comprises at least one taken from the group consisting of identifiers of the cells of the cell area and identifiers of radio access network nodes serving the cells of the cell area.

5. The method according to claim 4, wherein the information concerning the cell area indicates at least one cell of the cell area, which is selectable as the second cell, whereas after a change to another cell of the cell area the radio device resumes transmission on the radio connection by performing a random access procedure before requesting allocation of radio resources of the another cell.

6. The method according to claim 1, further comprising:
the radio device storing context data of the radio connection; and
the radio device performing the resuming transmission on the radio connection based on the stored context data of the radio connection.

7. The method according to claim 1, wherein the determined configuration comprises at least one of a cell-level identifier of the radio device.

8. A method of controlling radio transmission in a cellular network, the method comprising:
configuring, using a radio access network node, a radio connection between a radio device and the cellular network, the radio connection being registered for a cell area comprising at least a first cell and a second cell of the cellular network, the second cell being served by the radio access network node;
before a decision of the radio device to perform a change from the first cell to the second cell, the radio access network node determining a configuration which enables performing allocation of radio resources to the radio device via a control channel of the second cell, the determined configuration comprising at least one of a timing advance and a configuration of the scheduled request opportunities for the radio device;
after the change of the radio device from the first cell to the second cell, the radio access network node resuming transmission on the radio connection by performing allocation of radio resources of the second cell to the radio device based on the determined configuration;
after the change from the first cell to the second cell, the radio access network node maintaining a configuration which enables performing allocation of radio resources to the radio device via a control channel of the first cell; and
determining the configuration which enables performing allocation of radio resources to the radio device via the control channel of the first cell and the configuration which enables performing allocation of radio resources to the radio device via the control channel of the second cell when establishing the radio connection.

9. A method of controlling radio transmission in a cellular network, the method comprising:
configuring, using a radio access network node, a radio connection between a radio device and the cellular network, the radio connection being registered for a cell area comprising at least a first cell and a second cell of the cellular network, the first cell being served by the radio access network node;
before a decision of the radio device to perform a change from the first cell to the second cell, the radio access network node determining a configuration which enables performing allocation of radio resources to the radio device via a control channel of the first cell, the determined configuration comprising at least one of a timing advance and a configuration of scheduling request opportunities for the radio device;
after the change of the radio device from the first cell to the second cell, the radio access network node maintaining the determined configuration;
based on the determined configuration, the radio access network node allocating radio resources of the first cell to the radio device; and
in response to a failure of a transmission on the allocated resources of the first cell, the radio access network node initiating paging of the radio device by other radio access network nodes serving other cells of the cell area.

10. The method according to claim 9, wherein the configuration which enables performing allocation of radio resources to the radio device via the control channel of the first cell is determined when establishing the radio connection.

11. The method according to claim 9, wherein the configuration which enables performing allocation of radio resources to the radio device via the control channel of the first cell is determined while the radio device is located in the first cell.

12. The method according to claim 9, comprising:
the radio access network node transmitting information concerning the cell area to the radio device.

13. The method according to claim 12, wherein the information concerning the cell area comprises at least one taken from the group consisting of identifiers of the cells of the cell area and identifiers of radio access network nodes serving the cells of the cell area.

14. The method according to claim 9, further comprising:
the radio access network node storing context data of the radio connection; and
after a change of the radio device from the first cell to another cell of the cell area, the radio access network node maintaining the stored context data.

15. The method according to claim 14, further comprising:
the radio access network node obtaining the context data in response to a change of the radio device to the first cell.

16. The method according to claim 9, further comprising:
after a change of the radio device from the second cell back to the first cell, the radio access network node resuming transmission on the radio connection by performing allocation of radio resources of the first cell to the radio device based on the maintained configuration.

17. The method according to claim 16, wherein the radio access network node performs the resuming transmission on the radio connection based on the stored context data of the radio connection.

* * * * *